(12) United States Patent
Uchida

(10) Patent No.: US 9,955,094 B2
(45) Date of Patent: Apr. 24, 2018

(54) IMAGING APPARATUS AND SIGNAL PROCESSING METHOD

(71) Applicant: CANON KABUSHIKI KAISHA, Tokyo (JP)

(72) Inventor: Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/134,585

(22) Filed: Apr. 21, 2016

(65) Prior Publication Data
US 2016/0316158 A1 Oct. 27, 2016

(30) Foreign Application Priority Data

Apr. 22, 2015 (JP) ................................. 2015-087703

(51) Int. Cl.
*H04N 5/232* (2006.01)
*H04N 5/369* (2011.01)
*H04N 5/265* (2006.01)

(52) U.S. Cl.
CPC ....... *H04N 5/3696* (2013.01); *H04N 5/23212* (2013.01); *H04N 5/23245* (2013.01); *H04N 5/265* (2013.01)

(58) Field of Classification Search
CPC ........... H04N 5/23212; H04N 5/23245; H04N 5/265; H04N 5/3696
See application file for complete search history.

(56) References Cited

U.S. PATENT DOCUMENTS

| 6,430,368 B1* | 8/2002 | Hata | H04N 5/23212 348/E5.045 |
|---|---|---|---|
| 2011/0150349 A1* | 6/2011 | Kojima | G06K 9/00228 382/224 |
| 2011/0273599 A1* | 11/2011 | Murata | G02B 7/36 348/294 |
| 2012/0154637 A1* | 6/2012 | Hara | H04N 5/23212 348/239 |
| 2013/0002936 A1* | 1/2013 | Hirama | H04N 5/23212 348/349 |
| 2014/0293116 A1* | 10/2014 | Okamoto | G03B 13/36 348/349 |

(Continued)

FOREIGN PATENT DOCUMENTS

JP 2001-124984 A 5/2001

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An imaging apparatus includes an imaging unit including a plurality of pixels each including a first photoelectric conversion unit, a second photoelectric conversion unit, and a microlens collecting light to the first photoelectric conversion unit and the second photoelectric conversion unit, and a first mixing unit configured to mix output signals from the first photoelectric conversion units of the plurality of pixels to generate a first signal and configured to output the first signal and a second signal based on the output signal from the first photoelectric conversion unit and an output signal from the second photoelectric conversion unit from each of the plurality of pixels, an image processing unit configured to generate an image based or the second signal, and a focus detection processing unit configured to perform focus detection based on the first signal and the second signal.

17 Claims, 14 Drawing Sheets

(56) References Cited

U.S. PATENT DOCUMENTS

| | | | | |
|---|---|---|---|---|
| 2015/0319412 A1* | 11/2015 | Koshiba | ............... | H04N 5/367 |
| | | | | 348/246 |
| 2015/0373251 A1* | 12/2015 | Haneda | ............ | H04N 5/23212 |
| | | | | 348/345 |
| 2016/0080713 A1* | 3/2016 | Tanaka | ................. | H04N 9/045 |
| | | | | 348/242 |
| 2017/0134681 A1* | 5/2017 | Koh | .................... | H04N 5/378 |

\* cited by examiner

IMAGING APPARATUS AND SIGNAL PROCESSING METHOD

BACKGROUND OF THE INVENTION

Field of the Invention

The present invention relates to an imaging apparatus and a signal processing method.

Description of the Related Art

Recently, in an imaging apparatus using an imaging element such as a CMOS sensor, multifunction has progressed, and not only generation of picked-up images such as a still image or a moving image but also control of the imaging apparatus such as focus adjustment, for example, is performed based on subject information obtained by the imaging element in some cases.

Japanese Patent Application Laid-Open No. 2001-124984 discloses an imaging apparatus configured to be capable of pupil division type focus detection by using signals obtained from an imaging element. In the configuration described in Japanese Patent Application Laid-Open No. 2001-124984, one microlens and two photodiodes are provided for each pixel of the imaging element, and the respective photodiodes receive light having passed through pupil regions different from each other of a photographic lens. By means of this configuration, the focus can be detected by comparing output signals from the two photodiodes, and a picked-up image can be generated by adding the output signals from the two photodiodes.

However, with the technology disclosed in Japanese Patent Application Laid-Open No. 2001-124984, since the signals of the two photodiodes are read out from the imaging element, a data amount increases and a readout time extends, and a frame rate lowers. Alternatively, in order to maintain the frame rate, a data transfer rate needs to be increased, which results in enlargement of a circuit scale or power.

SUMMARY OF THE INVENTION

An object of the present invention is to provide an imaging apparatus and a signal processing method capable of focus detection based on information of an imaging element while suppressing an increase of a data amount.

According to one aspect of the present invention, there is provided an imaging apparatus including an imaging unit including a plurality of pixels each including a first photoelectric conversion unit, a second photoelectric conversion unit, and a microlens collecting light to the first photoelectric conversion unit and the second photoelectric conversion unit, and a first mixing unit configured to mix output signals from the first photoelectric conversion units of the plurality of pixels to generate a first signal, the imaging unit being configured to output the first signal and a second signal based on the output signal from the first photoelectric conversion unit and an output signal from the second photoelectric conversion unit from each of the plurality of pixels, an image processing unit configured to generate an image based on the second signal, and a focus detection processing unit configured to perform focus detection based on the first signal and the second signal.

According to another aspect of the present invention, there is provided a signal processing method executed in an imaging apparatus including an imaging unit including a plurality of pixels each including a first photoelectric conversion unit, a second photoelectric conversion unit, and a microlens collecting light to the first photoelectric conversion unit and the second photoelectric conversion unit, and a mixing unit configured to mix output signals from the first photoelectric conversion units of the plurality of pixels to generate a first signal, the method including obtaining the first signal from the imaging unit, obtaining a second signal based on the output signal from the first photoelectric conversion unit and an output signal from the second photoelectric conversion unit from each of the plurality of pixels of the imaging unit, generating data for an image based on the second signal, and generating data for AF based on the first signal and the second signal.

According to further another aspect of the present invention, there is provided a non-transitory computer readable storage medium storing a program executed in an imaging apparatus including an imaging unit including a plurality of pixels each including a first photoelectric conversion unit, a second photoelectric conversion unit, and a microlens collecting light to the first photoelectric conversion unit and the second photoelectric conversion unit, and a mixing unit configured to mix output signals from the first photoelectric conversion unit of the plurality of pixels to generate a first signal, causing a computer to execute obtaining the first signal from the imaging unit, obtaining a second signal based on the output signal from the first photoelectric conversion unit and an output signal from the second photoelectric conversion unit from each of the plurality of pixels of the imaging unit, generating data for an image based on the second signal, and generating data for AF based on the first signal and the second signal.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
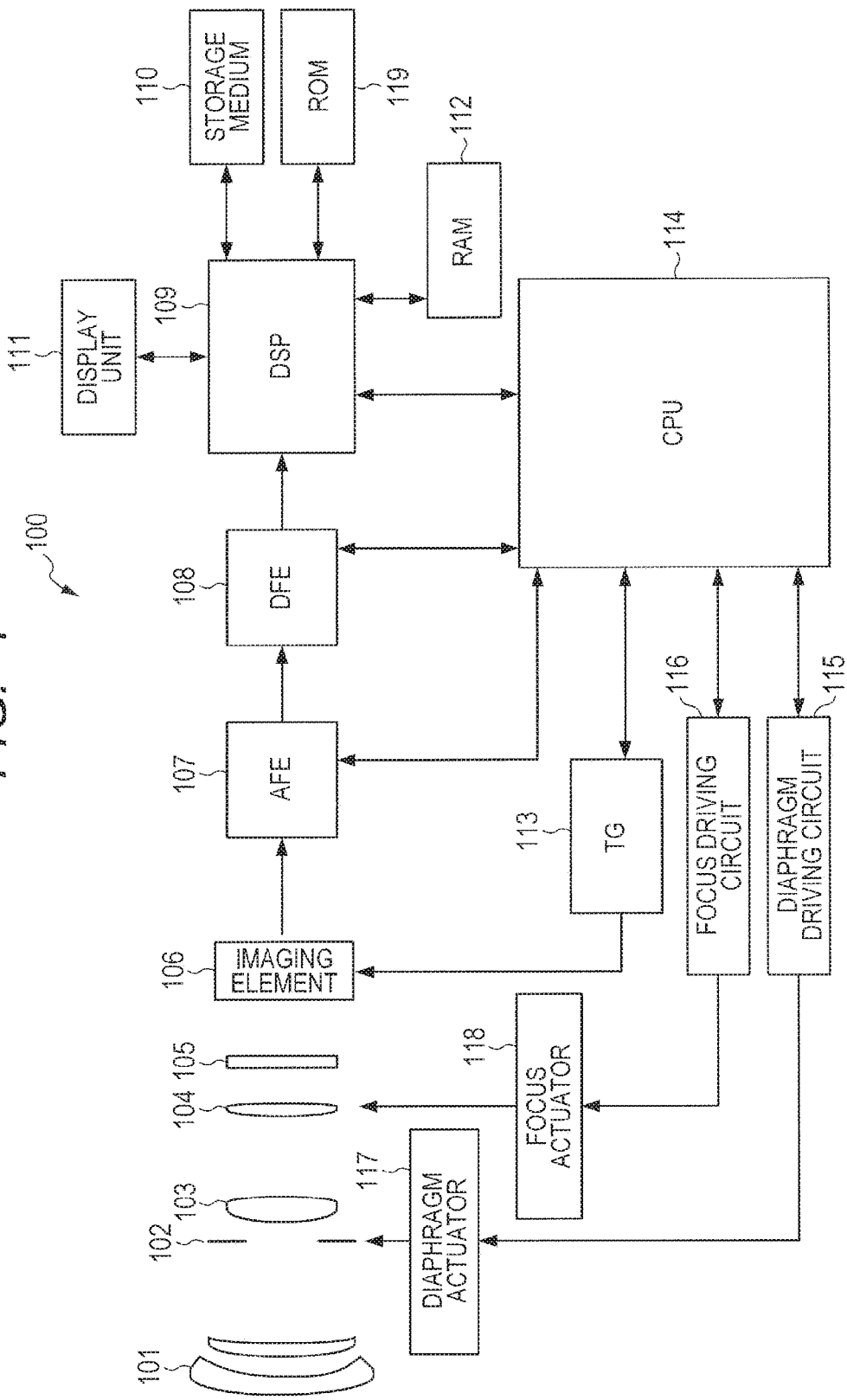
FIG. 1 is a block diagram illustrating schematic configuration of an imaging apparatus according to a first embodiment of the present invention.
Figure 2:
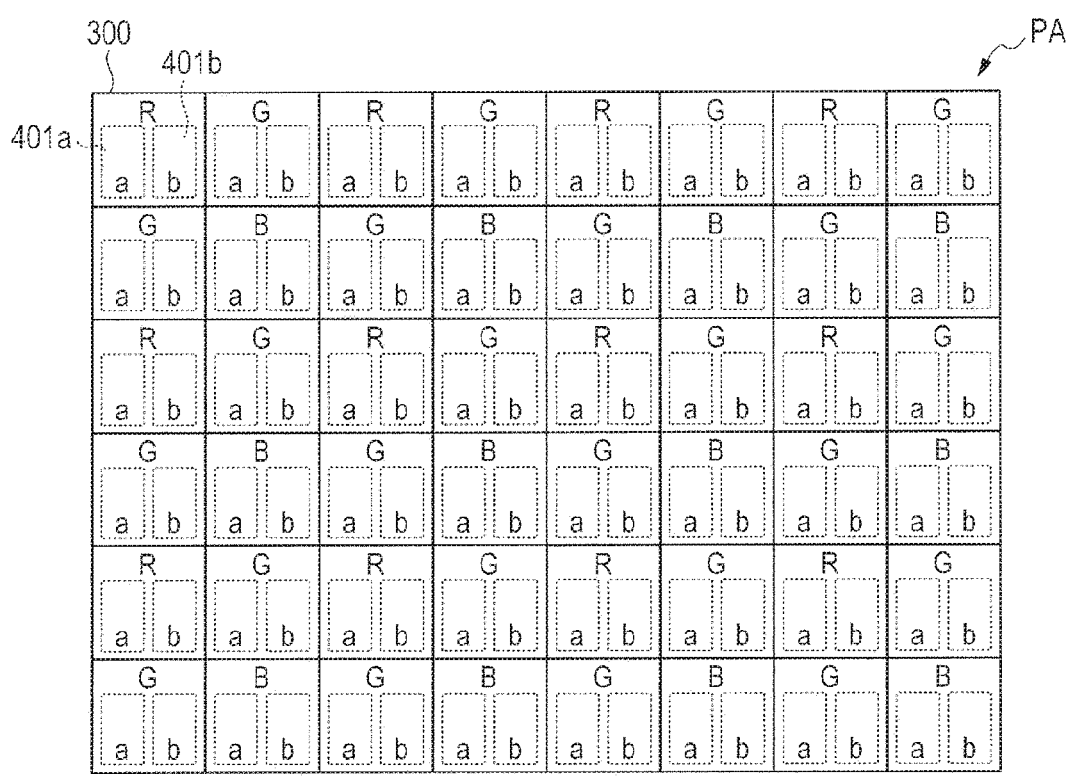
FIG. 2 is a plan view illustrating an example of pixel arrangement of an imaging element in the imaging apparatus according to the first embodiment of the present invention.
Figure 3:
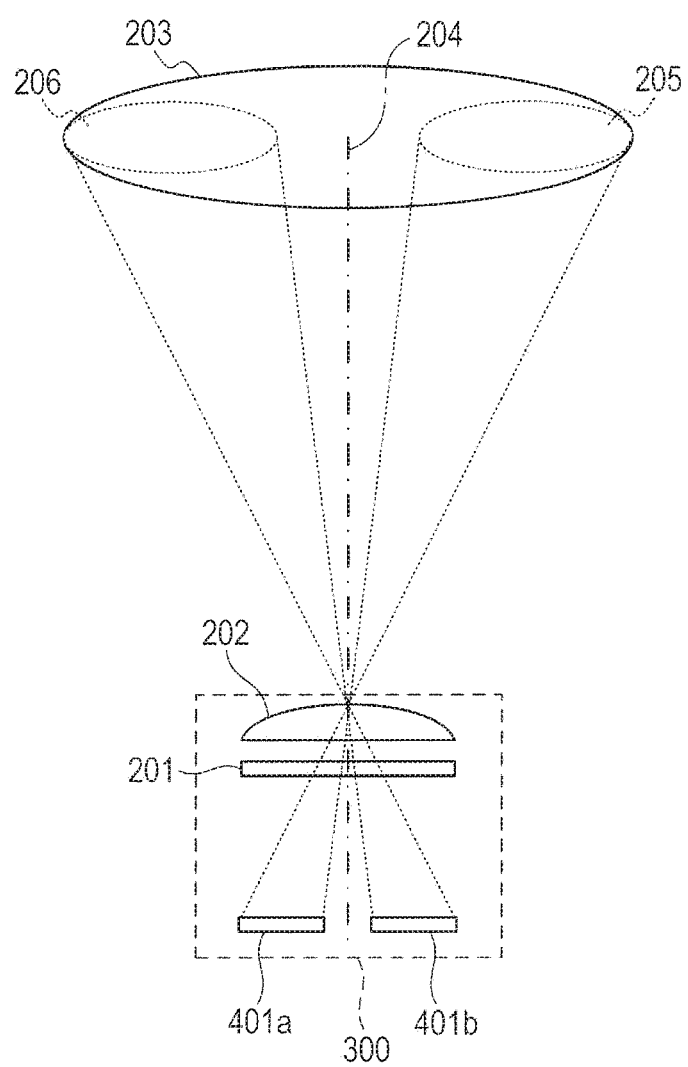
FIG. 3 is a schematic view illustrating a relation between a light flux emitted from an exit pupil of an imaging optical system and a unit pixel.
Figure 4A:
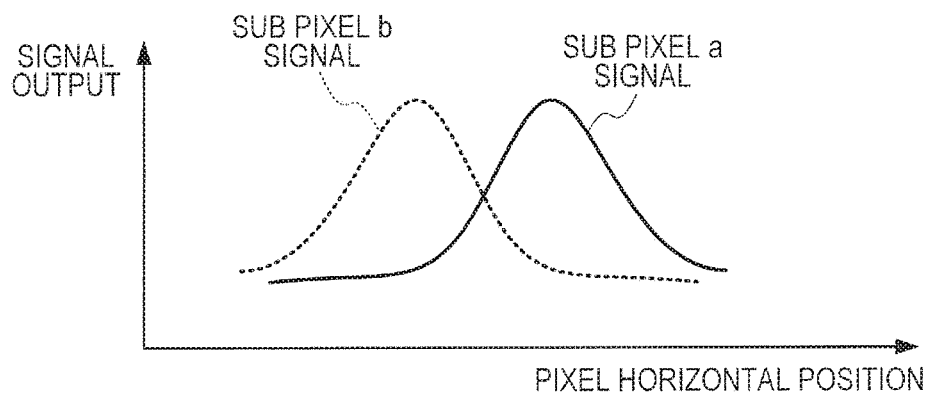
FIGS. 4A and 4B are graphs illustrating examples of image signal waveforms obtained from two sub pixels of the imaging element.
Figure 4B:
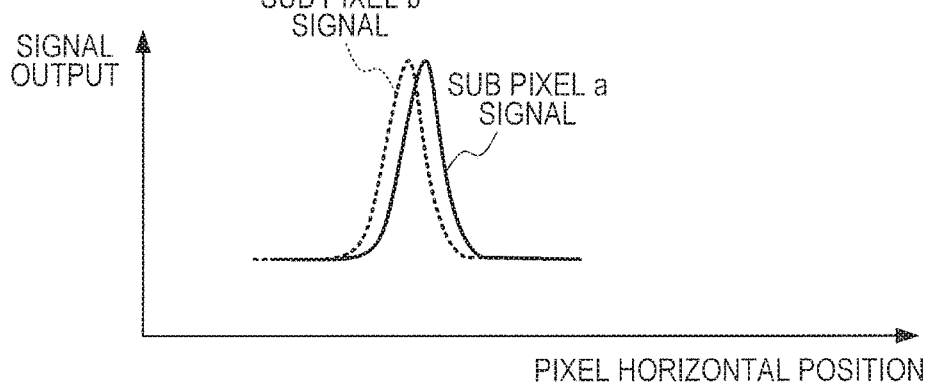
Figure 5:
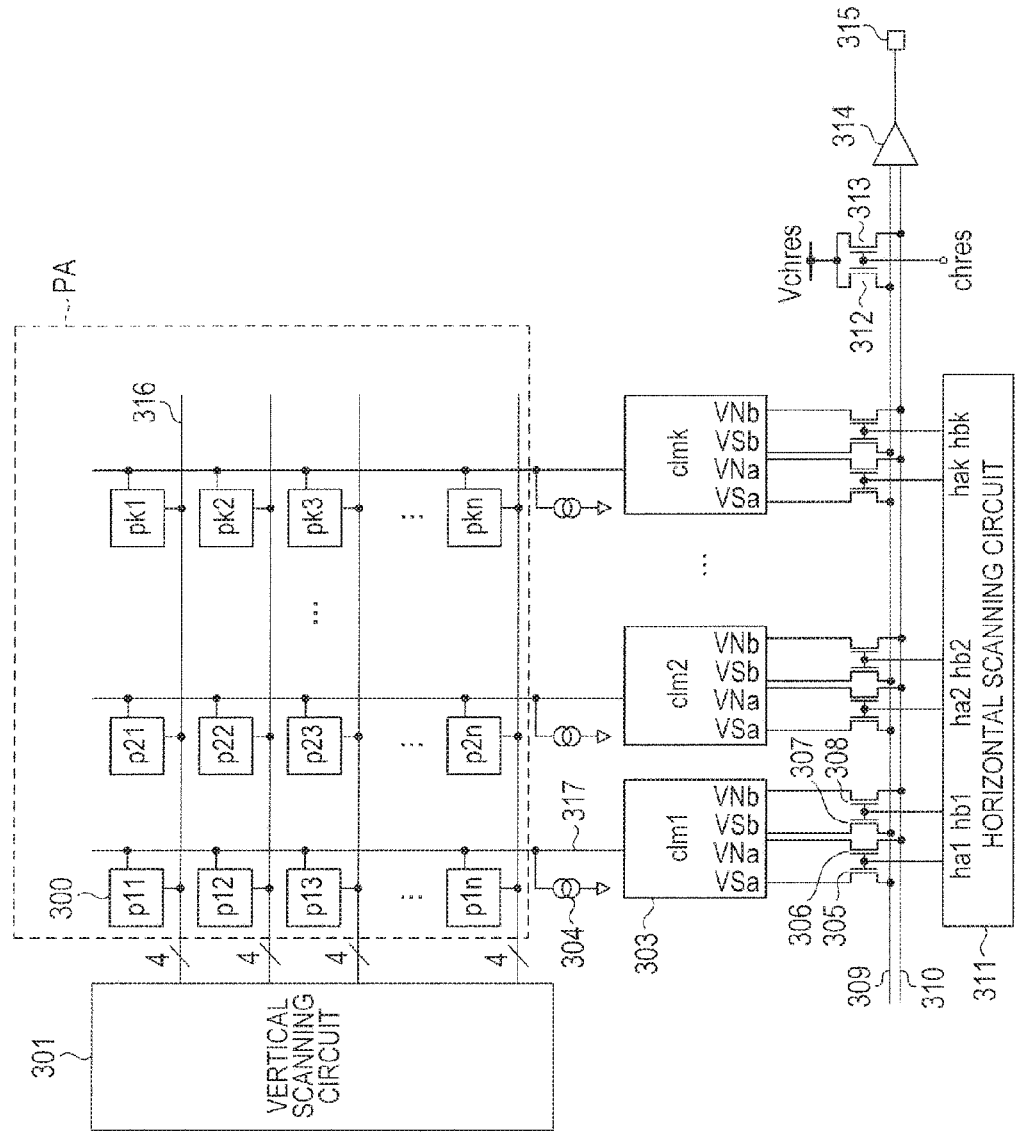
FIG. 5 is a schematic view illustrating an example of configuration of the imaging element in the imaging apparatus according to the first embodiment of the present invention.
Figure 6:
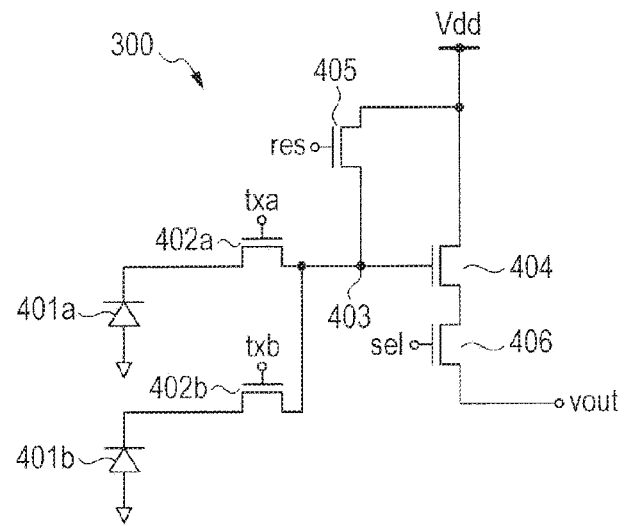
FIG. 6 is a view illustrating an example of circuit configuration of the unit pixel of the imaging element in the imaging apparatus according to the first embodiment of the present invention.
Figure 7:
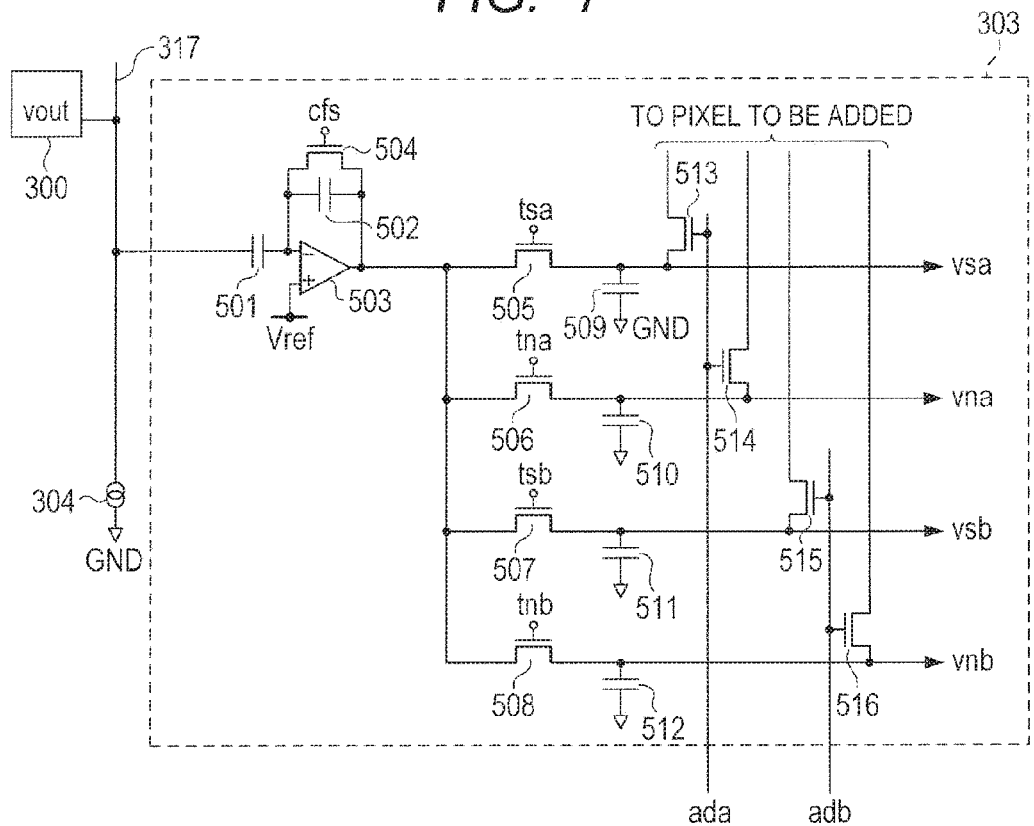
FIG. 7 is a view illustrating an example of configuration of a common column readout circuit of the imaging element in the imaging apparatus according to the first embodiment of the present invention.
Figure 8:
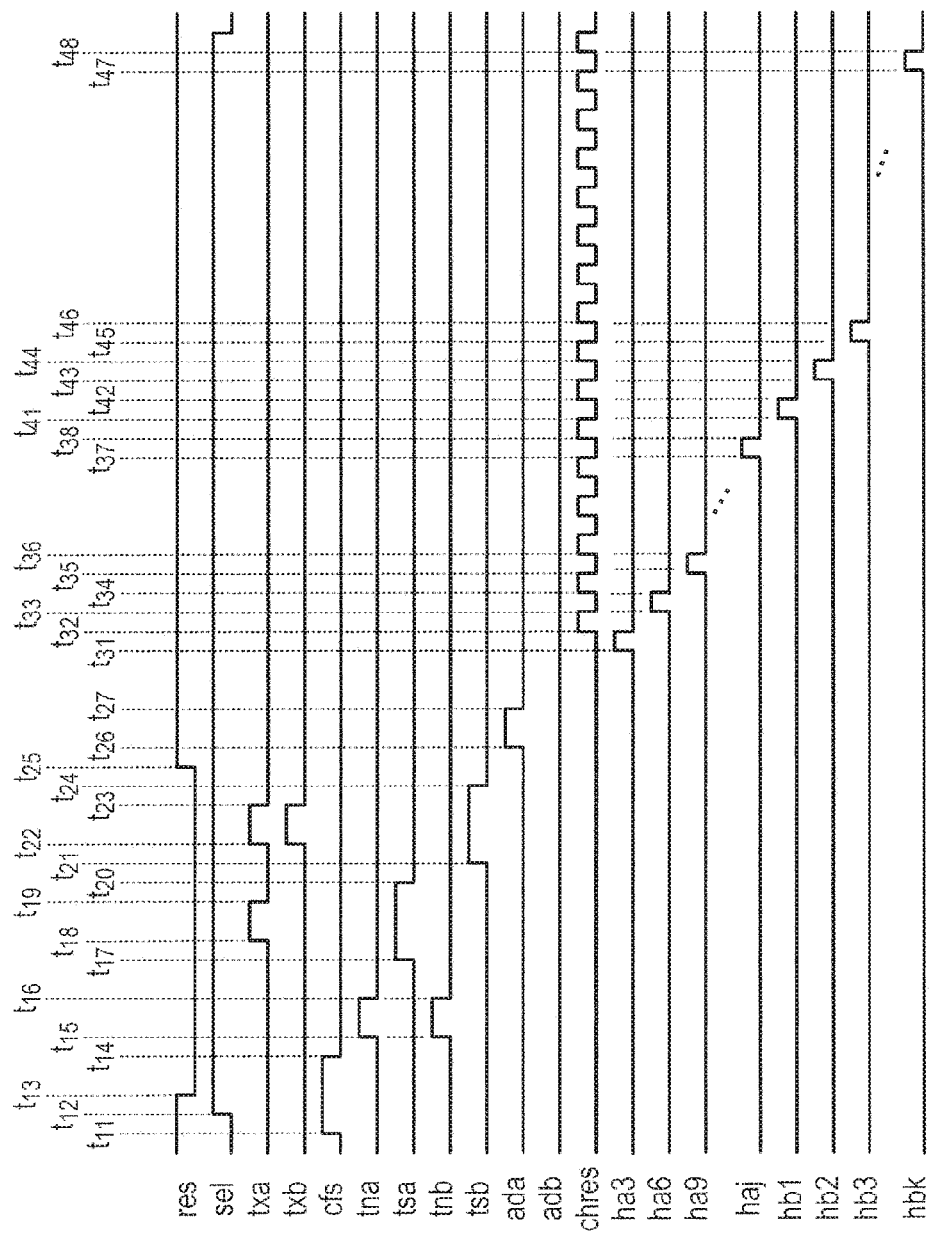
FIG. 8 is a timing chart illustrating a readout operation of the imaging element in the imaging apparatus according to the first embodiment of the present invention.
Figure 9:
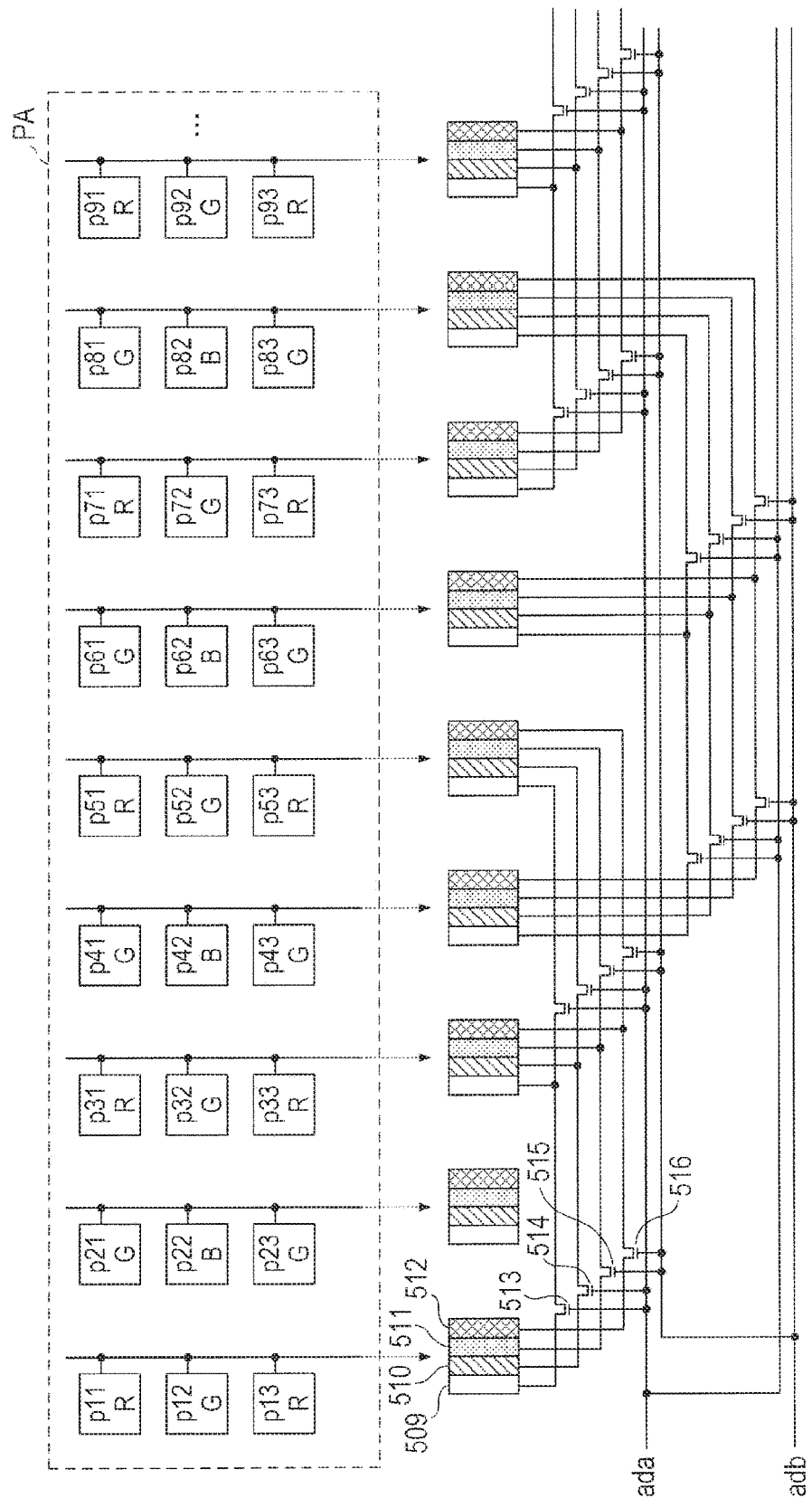
FIGS. 9 and 10 are schematic views illustrating a signal processing method according to the first embodiment of the present invention.
Figure 10:
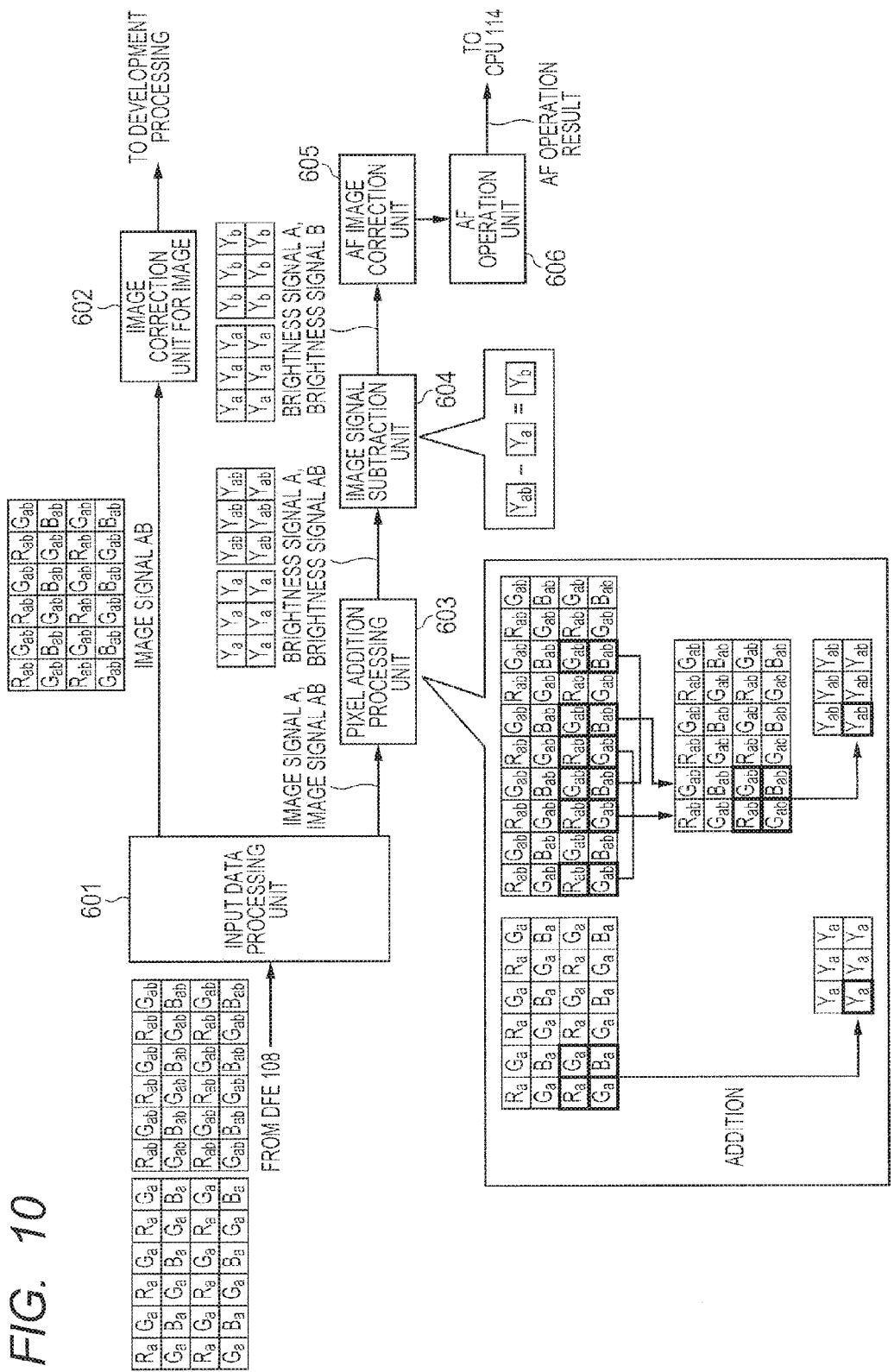

An imaging apparatus and a signal processing method according to a first embodiment of the present invention will be described with reference to FIGS. 1 to 10. FIG. 1 is a block diagram illustrating schematic configuration of an imaging apparatus according to the present embodiment. FIG. 2 is a plan view illustrating an example of pixel arrangement of an imaging element in the imaging apparatus according to the present embodiment. FIG. 3 is a schematic view illustrating a relation between a light flux emitted from an exit pupil of an imaging optical system and a unit pixel. FIGS. 4A and 4B are graphs illustrating examples of image signal waveforms obtained from two sub pixels of the imaging element. FIG. 5 is a schematic view illustrating an example of configuration of the imaging element in the imaging apparatus according to the present embodiment. FIG. 6 is a view illustrating an example of circuit configuration of the unit pixel of the imaging element in the imaging apparatus according to the present embodiment. FIG. 7 is a view illustrating an example of configuration of a common column readout circuit of the imaging element in the imaging apparatus according to the present embodiment. FIG. 8 is a timing chart illustrating a readout operation of the imaging element in the imaging apparatus according to the present embodiment. FIGS. 9 and 10 are schematic views illustrating a signal processing method according to the present embodiment.

First, schematic configuration of the imaging apparatus according to the present embodiment will be described with reference to FIG. 1.

The imaging apparatus 100 in the present embodiment includes, as illustrated in FIG. 1, a first lens group 101, a diaphragm 102, a second lens group 103, a third lens group 104, an optical low-pass filter 105 and an imaging element 106. Moreover, the imaging apparatus 100 includes a diaphragm actuator 111, a focus actuator 118, a diaphragm driving circuit 115 and a focus driving circuit 116. Moreover, the imaging apparatus 100 includes an AFE (Analog Front End) 107, a DFE (Digital Front End) 108 and a DSP (Digital Signal Processor) 109. Moreover, the imaging apparatus 100 includes a display unit 111, a RAM 112, a timing generator (TG) 113, a CPU 114, a ROM 119 and a storage medium 110.

The first lens group 101, the diaphragm 102, the second lens group 103, the third lens group 104 and the optical low-pass filter 105 are arranged along an optical axis in this order from a subject side, and they constitute an imaging optical system. The imaging optical system is an optical system for forming an optical image of the subject. The first lens group 101 is a lens group arranged or a frontmost part (the subject side) of the imaging optical system and is held capable of moving back and forth along an optical axis direction. The diaphragm 102 includes a function of adjusting a light amount when taking a photo by adjusting its aperture. The second lens group 103 moves back and forth along the optical axis direction integrally with the diaphragm 102 and by interlocking with the operation of moving back and forth of the first lens group 101, a magnification operation (zoom function) is realized. The third lens group 104 includes a function of focus adjustment by moving back and forth along the optical axis direction. The optical low-pass filter 105 is an optical element for reducing a false color or moire of a taken image.

In the present embodiment, the example in which a lens device having the imaging optical system is configured integrally with a body of the imaging apparatus is illustrated, but the embodiment of the present invention is not limited to that. The present invention can be also applied to an imaging system including an imaging apparatus body and a lens apparatus (imaging optical system) detachably attached to the imaging apparatus body.

The diaphragm actuator 117 includes a mechanism for changing an aperture of the diaphragm 102. The diaphragm driving circuit 115 is a driving circuit for adjusting a photographing light amount and executing exposure time control when a still image is shot by controlling the aperture of the diaphragm 102 by the diaphragm actuator 117. The focus actuator 118 includes a mechanism for driving back/forth the third lens group 104 along the optical axis direction. The focus driving circuit 116 is a driving circuit for adjusting a focus position by driving the focus actuator 118.

The imaging element 106 is an imaging element including a two-dimensional CMOS image sensor and a peripheral circuit and is arranged on an imaging surface of the imaging optical system. The imaging element 106 converts a subject image (optical image) formed by the imaging optical system to an electric signal by photoelectric conversion. In this specification, the imaging element 106 might be noted also as an imaging unit. The TG 113 is for supplying a driving signal for driving the imaging element 106 to the imaging element 106 at predetermined timing. The AFE 107 includes a function of converting an analog image signal output from the imaging element 106 to a digital image signal. The DFE 108 includes a function of executing predetermined operation processing to the digital image signal output from the AFE 107. The DSP 109 includes a function of executing correction processing and development processing to the digital image signal output from the DFE 108. The DSP 109 also includes a function of performing AF (auto-focus) operation for calculating a defocus amount from the image signal (digital image signal). The DFE 108 and the DSP 109 constitute a signal processing unit.

The display unit 111 includes a function for displaying a shot image and various menu screens. For the display unit 111, a liquid crystal display (LCD) or the like is used. The RAM 112 is a random access memory for temporarily storing image data or the like. The ROM 119 is a read only memory for storing various correction data and a program for executing predetermined processing. The storage medium 110 is for storing image data. The storage medium 110 may be a detachable memory card using a non-volatile semiconductor memory such as an SD memory card, for example. The RAM 112, the ROM 119 and the storage medium 110 are connected to the DSP 109.

The CPU 114 is a controller for controlling the entire imaging apparatus 100 and controls the AFE 107, the DFE 108, the DSP 109, the TG 113, the diaphragm driving circuit 115 and the focus driving circuit 116 and the like. For example, the CPU 114 controls the focus driving circuit 116 based on an AF operation result output from the DSP 109 and adjusts a focus position of the imaging optical system by the focus actuator 118.

Subsequently, an example of pixel arrangement of the imaging element 106 in the imaging apparatus 100 according to the present embodiment will be described with reference to FIG. 2.

The imaging element 106 includes, as illustrated in FIG. 2, for example, a pixel region PA in which a plurality of unit pixels 300 (one pixel) are arranged in a two-dimensional array shape along a row direction and a column direction. The pixel region PA is not particularly limited but can include a pixel array of unit pixels 300 in 1080 rows by 1920 columns, for example. In FIG. 2, the pixel array of 6 rows by 8 columns of them is extracted and illustrated.

Each of the unit pixels 300 includes two photodiodes (hereinafter noted as "PD") 401a and 401b, one microlens (not illustrated), and a color filter (not illustrated). The PD 401a and the PD 401b are photoelectric conversion units of two sub pixel a and sub pixel b included in the unit pixel 300, respectively. The microlens is provided one in each unit pixel 300 and collects incident light to the two photoelectric conversion units of the same unit pixel 300.

Reference characters a and b indicated in the unit pixel 300 in FIG. 2 represent the sub pixels a and b subjected to pupil division to right and left. An output signal a output from the sub pixel a and an output signal b output from the sub pixel b are used for focus detection. A signal (a/b addition signal) obtained by adding the output signal a and the output signal b is used for image generation (generation of a picked-up image). Reference characters R, G and R represent colors of the color filters, in which reference character P denotes a red filter, G for a green filter and B for a blue filter. To the two PDs 401a and 401b constituting one unit pixel 300, the color filter in the same color is assigned. FIG. 2 illustrates an example of arrangement of the color filters according to the so-called Bayer array, but the arrangement of the color filters is not limited to that.

Subsequently, a relation between a light flux emitted from the exit pupil of the imaging optical system (photographic lens) and the unit pixel 300 of the imaging element 106 will be described with reference to FIG. 3.

The unit pixel 300 includes the PDs 401a and 401b, and the color filter 201 and the microlens 202 arranged above the PDs 401a and 401b. It is assumed that the light flux having passed through the exit pupil 203 of the imaging optical system (photographic lens) is incident to this unit pixel 300 around an optical axis 204 of the imaging optical system. By paying attention to the light flux passing through pupil regions (partial regions) 205 and 206 different from each other in the exit pupil 203 of the imaging optical system (photographic lens), the light flux having passed through the pupil region 205 in them is received by the PD 401a of the sub pixel a through the microlens 202. On the other hand, the light flux having passed through the pupil region 206 is received by the PC 401b of the sub pixel b through the microlens 202.

As described above, each of the sub pixels a and b receives light having passed through separate regions (regions different from each other) of the exit pupil 203 of the photographic lens, respectively. Thus, by comparing the output signal of the sub pixel a and the output signal of the sub pixel b, focus detection of a phase-difference type can be made.

Subsequently, image signal waveforms obtained from the sub pixels a and b of the imaging element 106 will be described with reference to FIGS. 4A and 4B. FIG. 4A is a graph illustrating an example of the image signal waveforms obtained from the sub pixels a and b in a state out of focus (non-focused state). FIG. 4B is a graph illustrating an example of the image signal waveforms obtained from the sub pixels a and b in a focused state (substantially focused state). In FIGS. 4A and 4B, a vertical axis indicates a signal output, while a lateral axis indicates a position (pixel horizontal position).

In the out of focus state (in the case of the non-focused state), as illustrated in FIG. 4A, the image signal waveforms (the sub pixel a signal and the sub pixel b signal) obtained from the sub pixels a and b do not match each other but azo largely deviated from each other. As they get closer to the focused state from the non-focused state, as illustrated in FIG. 4B, the deviation between the image signal waveforms of the sub pixels a and b becomes smaller. Then, in the focused state, these image signal waveforms overlap each other. As described above, by detecting the deviation (shift amount) between the image signal waveforms obtained from the sub pixels a and b, a focus shift amount (defocus amount) can be detected, and by using this information, focus adjustment of the imaging optical system can be made.

Subsequently, a configuration example of the imaging element 106 in the imaging apparatus according to the present embodiment will be described more specifically by using FIGS. 5 to 7.

The imaging element 106 includes, as illustrated in FIG. 5, the pixel region PA, a vertical scanning circuit 301, a common column readout circuit 303 and a horizontal scanning circuit 311.

In the pixel region PA, the pixel array in which a pixel p11 to a pixel pkr each including the unit pixel 300 are arranged in the two-dimensional array shape along the row direction and the column direction is provided. Each of the unit pixels 300 includes, as illustrated in FIG. 6, the PDs 401a and 401b, transfer transistors 402a and 402b, a reset transistor 405, an amplifier transistor 404 and a select transistor 406. An anode of the PD 401a is connected to a ground voltage line, and a cathode of the PD 401a is connected to a source of the transfer transistor 402a. An anode of the PD 401b is connected to the ground voltage line, and a cathode of the PD 401b is connected to a source of the transfer transistor 402b. A drain of the transfer transistor 402a and a drain of the transfer transistor 402b are connected to a source of the reset transistor 405 and a gate of the amplifier transistor 404. Connection nodes of drains of the transfer transistors 402a and 402b, a source of the reset transistor 405 and a gate of the amplifier transistor 404 constitute a floating diffusion unit (hereinafter noted as "FD unit") 403. A drain of the reset transistor 405 and a drain of the amplifier transistor 404 are connected to a power voltage line (voltage Vdd). A source of the amplifier transistor 404 is connected to a drain of the select transistor 406.

The PDs 401a and 401b of the sub pixels a and b photoelectrically convert the incident optical signal (optical image) and accumulate charges according to exposure amount. The transfer transistors 402a and 402b transfer the charges accumulated in the PDs 401a and 401b to the FD unit 403 according to High level signals txa and txb. The FD unit 403 converts the charges transferred from the PDs 401a and 401b to a voltage according to the amount of the charges by its parasitic capacitor and applies it to the gate of the amplifier transistor 404. The reset transistor 405 is a switch for resetting the FD unit 403 and resets the FD unit 403 according to a High level signal res. When the charges of the PDs 401a and 401b are to be reset, the signal res and the signals txa and txb are set to High level at the same time, and the transfer transistors 402a and 402b and the reset transistor 405 are turned on. Then, via the FD unit 403, the PDs 401a and 401b are reset. The select transistor 406 outputs a pixel signal converted by the amplifier transistor 404 to a voltage to an output node vout of the unit pixel 300 (pixel) according to a signal sel at the High level.

In each row of the pixel array of the pixel region PA, as illustrated in FIG. 5, a driving signal line 316 is provided by extending in the row direction, respectively. The driving signal line 316 is connected to the vertical scanning circuit 301. To the driving signal line 316, predetermined driving signals for driving a pixel readout circuit of the unit pixels 300 at predetermined timing from the vertical scanning circuit 301 are output. Specifically, the respective driving signal lines 316 include a plurality of (four, here) signal lines for supplying the aforementioned signal txa, signal txb, signal res and signal sel to the plurality of unit pixels 300 aligned in the row direction. Each signal line makes a signal line common to the plurality of unit pixels 300 belonging to the same row.

In each column of the pixel array of the pixel region PA, a vertical output line 317 is provided, respectively, by extending in the column direction. The vertical output line 317 is connected to the source of the select transistor 406, that is, the output node vout of the unit pixel 300. The vertical output line 317 makes a signal line common to the plurality of unit pixels 300 belonging to the same column. To the respective vertical output line 317, the common column readout circuit 303 and a current source 304 are connected. As a result, the current source 304 and the amplifier transistor 404 of the unit pixel 300 constitute a source follower circuit so that a signal read out from each of the unit pixels 300 of the pixel region PA can be output to the common column readout circuit 303. In FIG. 5, reference characters clm1 to clmk are given to the common column readout circuit 303 of each column. The common column readout circuit 303 constitutes a readout circuit unit for reading out an output signal from each pixel or its sub pixel of the pixel region PA.

The respective common column readout circuit 303 includes a circuit illustrated in FIG. 7, for example.

The common column readout circuit 303 includes, as illustrated in FIG. 7, a clamp capacitor 501, a feedback capacitor 502, an operational amplifier 503 and a switch 504. The common column readout circuit 303 includes transfer switches 505, 506, 507 and 508, capacitors 509, 510, 511 and 512 and signal addition switches 513, 514, 515 and 516.

An inverting input terminal of the operational amplifier 503 is connected to the vertical output line 317 via the clamp capacitor 501. To a non-inverting input terminal of the operational amplifier 503, a reference voltage power supply Vref is connected. Between the inverting input terminal and an output terminal of the operational amplifier 503, the feedback capacitor 502 and the switch 504 are connected in parallel. A conduction state of the switch 504 is controlled by a signal cfs supplied to the control node thereof.

To the output terminal of the operational amplifier 503, one of main nodes of the transfer switches 505, 506, 507 and 508 are connected, respectively. To the other main nodes of the transfer switches 505, 506, 507 and 508, one of main nodes of the capacitors 509, 510, 511 and 512 and the signal addition switches 513, 514, 515 and 516 are connected, respectively. The conduction states of the transfer switches 505, 506, 507 and 508 are controlled by signals tsa, tna, tsb and tnb supplied to the respective control nodes. The conduction states of the signal addition switches 513 and 514 are controlled by a signal ada supplied to their control nodes. The conduction states of the signal addition switches 515 and 516 are controlled by a signal adb supplied to their control nodes. The other main nodes of the transfer switches 505, 506, 507 and 508 are connected to output nodes vsa, vna, vsb and vnb of the common column readout circuit 303, respectively.

The transfer switch 505 is a switch used when a signal read out from the unit pixel 300 is transferred to the capacitor 509. Similarly, the transfer switch 506 is a switch used when the signal read out from the unit pixel 300 is transferred to the capacitor 510. The transfer switch 507 is a switch used when the signal read out from the unit pixel 300 is transferred to the capacitor 511. The transfer switch 508 is a switch used when the signal read out from the unit pixel 300 is transferred to the capacitor 512. By means of the readout operation which will be described later, a pixel signal Sa of the sub pixel a is stored in the capacitor 509 (first S-signal holding capacitor), and an a/b addition signal Sab obtained by adding the signals of the sub pixels a and b is stored in the capacitor 511 (second S-signal holding capacitor). In the capacitor 510 (first N-signal holding capacitor) and the capacitor 512 (second N-signal holding capacitor), a noise signal N of the unit pixel 300 is stored, respectively.

The signal addition switches 513, 514, 515 and 516 are switches across the plurality of common column readout circuits 303. The signal addition switches 513 and 514 are controlled by the signal ada, while the signal addition switches 515 and 516 are controlled by the signal adb. By turning on/off these signal addition switches 513, 514, 515 and 516 by the signals ada and adb, the signals held in the capacitors 509, 510, 511 and 512 can be additionally averaged with the signals of other common column readout circuits 303. In the present embodiment, as will be described later, the signals of the three adjacent pixels in the same color are additionally averaged. Processing of addition averaging of the signals of the plurality of pixels is also called pixel mixing or pixel mixing operation. The signal addition switches 513, 514, 515 and 516 constitute a data mixing unit.

The output nodes vsa and vna of the common column readout circuit 303 are, as illustrated in FIG. 5, connected to the one of main nodes of the horizontal transfer switches 305 and 306, respectively. The other main nodes of the horizontal transfer switches 305 and 306 are connected to the horizontal output lines 309 and 310, respectively. The conduction states of the horizontal transfer switches 305 and 306 are controlled by select signals ha* ("*" is a column number of 1 to K) supplied to their control nodes from the horizontal scanning circuit 311. When the select signal ha* becomes a High level, the signals of the capacitor 509 (first S-signal holding capacitor) and the capacitor 510 (first N-signal holding capacitor) are transferred to horizontal output lines 309 and 310, respectively. Similarly, the output nodes vsb and vnb of the common column readout circuit 303 are connected to the one of main nodes of the horizontal transfer switches 307 and 308, respectively. The other main nodes of the horizontal transfer switches 307 and 308 are connected to the horizontal output lines 309 and 310, respectively. The conduction states of the horizontal transfer switches 307 and 308 are controlled by select signals hb* ("*" is a column number of 1 to k) supplied to their control nodes from the horizontal scanning circuit 311. When the select signal hb* becomes the High level, the signals of the capacitor 511 (second S-signal holding capacitor) and the capacitor 512 (second H-signal holding capacitor) are transferred to the horizontal output lines 309 and 310, respectively.

The horizontal output lines 309 and 310 are connected to the one of main nodes of horizontal output line reset switches 312 and 313, respectively. The other main nodes of the horizontal output line reset switches 312 and 313 are connected to a reset voltage Vchres. The conduction states of the horizontal output line reset switches 312 and 313 are controlled by a signal chres supplied to their control nodes. The horizontal output lines 309 and 310 are connected also to two input terminals of a differential amplifier 314, respectively. An output terminal of the differential amplifier 314 is connected to an output terminal 315. The differential amplifier 314 takes a difference between the S-signal and the N-signal and applies a predetermined gain with that and outputs a final output signal to the output terminal 315. The horizontal output line reset switches 312 and 313 are turned on when the signal chres becomes the High level, and the horizontal output lines 309 and 310 are reset to the reset voltage Vchres, respectively.

Subsequently, the readout operation of the imaging element 106 in the imaging apparatus according to this embodiment will be described with reference to FIG. 8. Here, the signal readout operation from the plurality of pixels belonging to one row in the pixel array in the pixel region PA will be described. When image information of one frame is to be obtained, the similar readout operation is sequentially performed for each row. It is assumed that, at time before time t11 in FIG. 8, the signal res is at the High level, while the other signals are at a Low level.

First, at the time t11, a signal cfs is set to the High level, and the switch 504 is turned on so as to connect the inverting input terminal of the operational amplifier 503 and the output terminal to each other and the operational amplifier 503 is brought into a buffer state.

Subsequently, at time t12, the signal sel supplied to the driving signal line 316 is changed by the vertical scanning circuit 301 from the Low level to the High level, and the select transistor 406 of the pixel is turned on. As a result, the source of the amplifier transistor 404 is connected to the current source 304 via the select transistor 406 and the vertical output line 317, and the source follower circuit is configured.

Subsequently, at time t13, the signal res supplied to the driving signal line 316 is changed from the High level to the Low level by the vertical scanning circuit 301, and the reset transistor 405 is turned off, and the reset operation of the FD unit 403 is terminated. As a result, to the vertical output line 317, a signal according to the reset level of the FD unit 403 is output.

Subsequently, at time t14, the signal cfs is returned from the High level to the Low level, and the switch 504 is turned off. As a result, the operational amplifier 503 enters an imaginary short state in which the output terminal and the inverting input terminal are connected via the feedback capacitor 502.

Subsequently, during a period from time t15 to time t16, the signals tna and tnb are set to the High level, and the transfer switches 506 and 508 are turned on. As a result, the output signal from the operational amplifier 503 is output to the capacitor 510 (first N-signal holding capacity) and the capacitor 512 (second N-signal holding capacity) via the transfer switches 506 and 508. The N-signals are stored in the capacitors 510 and 512, respectively.

Subsequently, at time t17, the signal tsa is set to the High level, and the transfer switch 505 is turned on.

Subsequently, during a period from time t18 to time t19, the signal txa supplied to the driving signal line 316 is changed by the vertical scanning circuit 301 from the Low level to the High level, and the transfer transistor 402a is turned on. By means of this operation, the charges accumulated in the PD 401a of the sub pixel a are transferred to the FD unit 403, and the signal according to an amount of the charges is output to the vertical output line 317 via the amplifier transistor 404 and the select transistor 406. The signal of the vertical output line 317 is amplified by a gain according to a capacitance ratio between the clamp capacitor 501 and the feedback capacitor 502 in the operational amplifier 503 and output to the capacitor 509 (first S-signal holding capacitor) via the transfer switch 505. This pixel signal Sa is stored in the capacitor 509.

Subsequently, at time t20, the signal tsa is set to the Low level, and the transfer switch 505 is turned off.

Subsequently, at time t21, the signal tsb is set to the High level, and the transfer switch 507 is turned on.

Subsequently, during a period from time t22 to time t23, the signals txa and txb supplied to the driving signal line 316 are changed from the Low level to the High level by the vertical scanning circuit 301, and the transfer transistors 402a and 402b are turned on. By means of this operation, the charges accumulated in the PD 401b of the sub pixel b are transferred to the FD unit 403, and the charges accumulated in both the PD 401a and 401b are held in the FD unit 403. Then, the signal according to an amount of the charges is output to the vertical output line 317 via the amplifier transistor 404 and the select transistor 406. The signal of the vertical output line 317 is amplified by a gain according to the capacitance ratio between the clamp capacitor 501 and the feedback capacitor 502 in the operational amplifier 503 and output to the capacitor 511 (second S-signal holding capacitor) via the transfer switch 507. This a/b addition signal Sab is stored in the capacitor 511.

Subsequently, at time t24, the signal tsb is set to the Low level, and the transfer switch 507 is turned off.

Subsequently, at time t25, the signal res supplied to the driving signal line 316 is changed from the Low level to the High level by the vertical scanning circuit 301, the reset transistor 405 is turned on, and the FD unit 403 is reset.

Subsequently, during a period from time t26 to time t27, the signal ada is set to the High level, and the signal addition switches 513 and 514 in each row are turned on once. As a result, the signal stored in the capacitor 509 (first S-signal holding capacitor) and the signal stored in the capacitor 510 (first N-signal holding capacitor) are additionally averaged with the signal of the respective rows to be added. At this time, the signal adb stays at the Low level, and the signals stored in the capacitor 511 (second 3-signal holding capacitor) and the signal stored in the capacitor 512 (second N-signal holding capacitor) are rot additionally averaged.

Here, an example of combinations of columns when addition averaging is performed will be described with reference to FIG. 9. In FIG. 9, a pixel p11 to a pixel p93 in the plurality of pixels provided in the pixel regions PA are extracted and illustrated. To each pixel p in FIG. 9, R (red), G (green) and B (blue) which are colors of the color filters arranged according to the Bayer array are added.

In the example in FIG. 9, the signal addition switch 513 is arranged so that the capacitors 509 (first S-signal holding capacitor) of a first column, a third column and a fifth column can be connected. Similarly, the signal addition switch 514 is arranged so that the capacitors 510 (first N-signal holding capacitor) of the first column, the third column and the fifth column can be connected. Moreover, the signal addition switch 515 is arranged so that the capacitors 511 (second S-signal holding capacitor) of the first column, the third column and the fifth column can be connected. The signal addition switch 516 is arranged so that the capacitors 512 (second N-signal holding capacitor) of the first column, the third column and the fifth column can be connected. By means of the similar configuration, the signal addition switches 513, 514, 515 and 516 are arranged so that each capacitor of a fourth column, a sixth column and an eighth column can be connected to each other. After that, the signal addition switches 513, 514, 515 and 516 are arranged so that connection can be made by combinations such as each capacitor of a seventh column, a ninth column and an eleventh column, each capacitor of a tenth column, a twelfth column and a fourteenth column, . . . .

In this configuration, by setting the signal ada to the High level as described above, the first S-signal and the first N-signal are additionally averaged in combinations such as the first/third/fifth columns, the fourth/sixth/eighth columns, the seventh/ninth/eleventh columns, . . . , respectively. Describing using the first row, the signals of the three R pixels of the pixels p11/p31/p51 and the signals of the three G pixels of the pixels p41/p61/p81 are additionally averaged, respectively. The combinations of the columns to be added are not limited to the aforementioned combinations but naturally, it may be other combinations. The number of pixels to be added is not limited to three, either. Instead of addition of the signals for each pixel having the color filter in the same color, the signals of the pixels having the color filters in different colors may be added. Moreover, instead of simple addition or addition averaging, it may be processing such as weighted addition.

Subsequently, in a period from time t31 to time t32, a select signal ha3 is changed from the Low level to the High level by the horizontal scanning circuit 311 by the horizontal scanning circuit 311, and the horizontal transfer switches 305 and 306 are turned on. As a result, the signal stored in the capacitor 509 (first S-signal holding capacitor) and the signal stored in the capacitor 510 (first N-signal holding capacitor) are output to the output terminal 315 via the horizontal output lines 309 and 310 and the differential amplifier 314. The signal read out here is obtained by subjecting the three pixel signals to addition averaging as described above. Therefore, signals are not read out from the capacitors 510 and 511 of the first column and the fifth column which are the same signals as the signals stored in the capacitors 510 and 511 of the third column.

Subsequently, during a period from time t32 to time t33, the signal chres is changed from the Low level to the High level, and the horizontal output line reset switches 312 and 313 are turned on. As a result, the horizontal output lines 309 and 310 are reset to the level of the reset voltage Vchres.

Subsequently, during a period from time t33 to time t38, the operation similar to that during the period from the time t31 to the time t33 is repeatedly performed, and the signals are sequentially read out from the capacitors 509 and 510 of the sixth column, the ninth column, . . . , the j-th column (j is a multiple of 3 not larger than k).

As described above, the horizontal scanning circuit 311 changes the select signal of the column sequentially to the High level by one column for each addition set such as a select signal ha3, a select signal ha6, a select signal ha9, . . . , a select signal haj so as to output a signal (image signal A) of the sub pixel a for one row. As a result, the image signals A additionally averaged by three pixels each in the horizontal direction are sequentially output, and the number of pieces of the output data of the image signal A can be an amount of ⅓ as compared with output of the signal from the pixel (k pixel) in each column.

Subsequently, after readout of the image signal A has been completed as above, during the period from time t41 to time 42, the select signal hb1 is changed from the Low level to the High level by the horizontal scanning circuit 311, and the horizontal transfer switches 307 and 308 are turned on. As a result, the signal stored in the capacitor 511 (second S-signal holding capacitor) and the signal stored in the capacitor 512 (second N-signal holding capacitor) are output to the output terminal 315 via the horizontal output lines 309 and 310 and the differential amplifier 314.

Subsequently, during a period from time t42 to time t43, the signal chres is changed from the Low level to the High level, and the horizontal output line reset switches 312 and 313 are turned on. As a result, the horizontal output lines 309 and 310 are reset to the level of the reset voltage Vchres.

Subsequently, during a period from time t43 to time t48, the operation similar to that during the period from the time t41 to the time t43 is repeatedly performed, and readout of the signal from the capacitors 510 and 511 from the second column to the k-th column is sequentially performed.

As described above, the horizontal scanning circuit 311 changes the select signal hb1, hb2, . . . , hbk which are select signals of each column sequentially to the High level so as to output the a/b addition signal (image signal AB) of the pixel for one row. Since the addition averaging processing is not applied to the image signal AB, the signal is output from the pixel (k pixel) of each column.

Subsequently, the signal processing method of the image signal A and the image signal AB in the DSP 109 will be described with reference to FIG. 10.

The DSP 109 includes, as illustrated in FIG. 10, an input data processing unit 601, an image correction unit 602 for image, a pixel addition processing unit 603, an image signal subtraction unit 604, an AF image correction unit 605 and an AF operation unit 606.

Into the input data processing unit 601, the signal (the image signal A, the image signal AB) read out from the imaging element 106 by the aforementioned readout operation are input via the AFE 107 and the DFE 108. The input data processing unit 601, first, sorts the input signals to the pixel addition processing unit 603 and the image correction unit 602 for image as data for AF processing and data for image processing. That is, into the pixel addition processing unit 603, the image signal A and the image signal AB are output as the data for AF processing. Into the image correction unit 602 for image, the image signal AB is output as the data for image processing.

In the image correction unit 602 for image, correction processing such as offset correction and gain correction is performed to the image signal AB sent from the input data processing unit 601. The data processed in the image correction unit 602 for image is then, subjected to development processing in the image processing unit, not illustrated, and used for generation of images such as a still image and a moving image.

In the pixel addition processing unit 603, the pixel addition processing is applied to the image signal A and the image signal AB sent from the input data processing unit 601. To the image signal A which has been already additionally averaged in the horizontal direction in the imaging element 106 by the aforementioned processing, the pixel signals (image signals A) are added for each pixel array of two rows by two columns which is a pixel array unit of the Bayer array as indicated by a bold frame in the figure so as to generate a brightness signal A. To the image signal AB, similarly to the processing performed to the signal A in the imaging element 106, the addition averaging processing of three pixels in the same color is performed in the horizontal direction. Moreover, the pixel signals (image signals AB) are added for each pixel array unit of the Bayer array, and a brightness signal AB having a spatial sampling frequency equal to that of the brightness signal A is generated.

In the image signal subtraction unit 604, the brightness signal A (Ya) is subtracted from the brightness signal AB (Yab) so as to generate a brightness signal B (Yb). The brightness signal AB (Yab) is a signal obtained by adding the signals of the sub pixels a and b, and the brightness signal A (Ya) is a signal of the sub pixel a. Thus, the difference (Yab−Ya) represents the brightness signal B (Yb) of the sub pixel b.

In the AF image correction unit 605, the correction processing such as offset correction and gain correction is performed to the brightness signal A (Ya) and the brightness signal B (Yb). The data processed in the AF image correction unit 605 is output to the AF operation unit 606 (focus detection processing unit).

In the AF operation unit 606, AF operation is performed based on the data after correction, and a defocus amount is detected (a defocus amount of the subject is calculated). At this time, the AF operation unit 606 performs focus detection by carrying out the processing such as correlation calculation based on the brightness signal A (first brightness signal) and the brightness signal B (third brightness signal). The CPU 114 controls the focus driving circuit 116 based on the calculation result of the AF operation unit 606 and performs focus adjustment.

In the aforementioned description, it is assumed that the DSP 109 performs all the series of processing in this specification bat this is not limiting. A part of the processing may be configured to be performed by the DFE 103, for example.

By means of the aforementioned operations, the signal additionally averaged in the horizontal direction is output as the image signal A, and the signal not additionally averaged is output as the image signal AB from the imaging element 106. An output data amount from the imaging element 106 is reduced by a portion of addition averaging of the image signal A, and the data transfer rate can be lowered. Alternatively, the readout operation can be completed in a short time even at the same transfer rate.

Since the image signal AB is used for image generation, in order to maintain resolution, addition averaging is not preferable. On the other hand, the image signal A is used only for the AF operation, and since interpolation operation makes up for, even if an information amount lowers by addition averaging, sufficient accuracy can be met.

In the present embodiment, addition averaging of the image signal A is configured to be performed in the imaging element 106, but addition averaging of the image signal A does not necessarily have to be performed in the imaging element 106. Certain effects can be obtained as long as timing for performing the addition averaging processing of the image signal A is before the portion of sorting into the image data and the AF data (input data processing unit 601). For example, if the addition averaging processing is performed to the image signal A in the AFE 107 or the DFE 108, the effect of reducing the transfer rate between the AFE 107 and the DFE 108 or between the DFE 108 and the DSP 109 can be obtained. However, in this case, the transfer rate between the imaging element 106 and the AFE 107 at which the data before the addition averaging is transferred is not reduced.

The signal addition switches 515 and 516 are switches for performing addition averaging to the image signal AB in the horizontal direction. In the present embodiment in which the addition averaging of the image signal AB is not performed, the signal addition switches 515 and 516 are not used. The signal addition switches 515 and 516 can be used in order to realize a moving picture mode at a high-speed frame rate by compressing the data amount by applying the horizontal addition processing also to the image signal AB used for image generation when a high-speed moving picture or still image is to be shot, for example. In such a photographing mode at a high-speed frame rate, it can be so configured that the image signal AB is also subjected to addition averaging processing similar to that applied to the image signal A and is output from the imaging element 106, while the addition averaging processing is performed only for the image signal A as described in the present embodiment in the photographing mode other than that. Moreover, such configuration can be considered that the number of pixels for which the addition averaging of the image signal A is performed is further increased (addition averaging of three pixels for the image signal AB and the addition averaging of five pixels for the image signal A, for example) in the photographing mode at a high-speed frame rate. In this case, accuracy of the AF operation tends to deteriorate qualitatively, but photographing at a higher-speed frame rate can be realized in a certain transfer rate.

Moreover, in the present embodiment, addition averaging of the pixel signal is performed only in the horizontal direction, and addition averaging of the pixel signal in the vertical direction is not performed, but addition averaging of the pixel signal in the vertical direction may be configured to be performed in order to match an aspect ratio of an image, for example. This addition averaging processing may be performed in the imaging element 106 or in a functional block on a tear stage such as the DSP 109.

As described above, according to the present embodiment, the imaging apparatus capable of highly accurate focus detection can be realized while suppressing an increase of the data amount based on the information from the imaging element.

Second Embodiment

Figure 11:
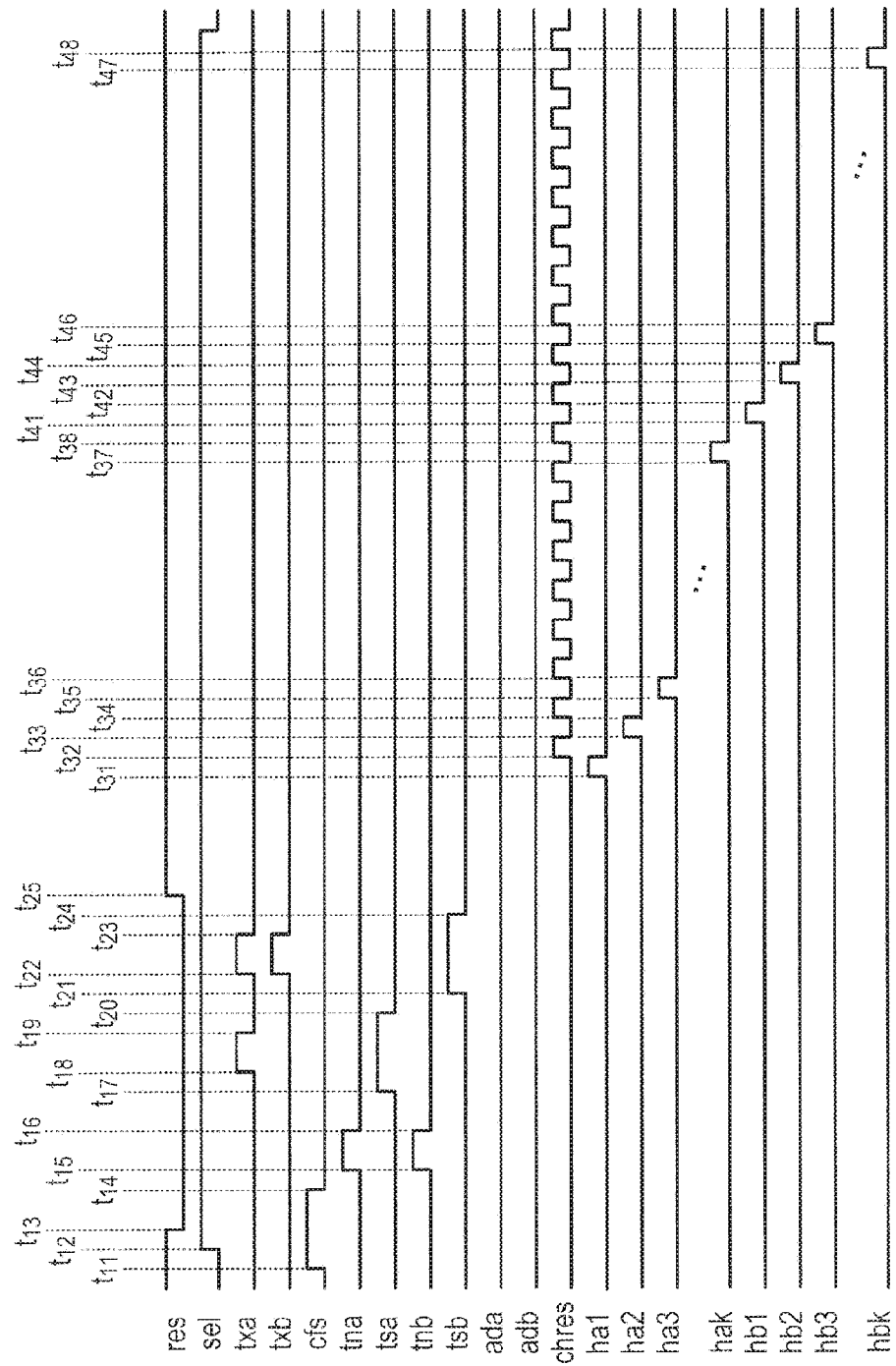
FIG. 11 is a timing chart illustrating a readout operation of an imaging element in an imaging apparatus according to a second embodiment of the present invention.
Figure 12:
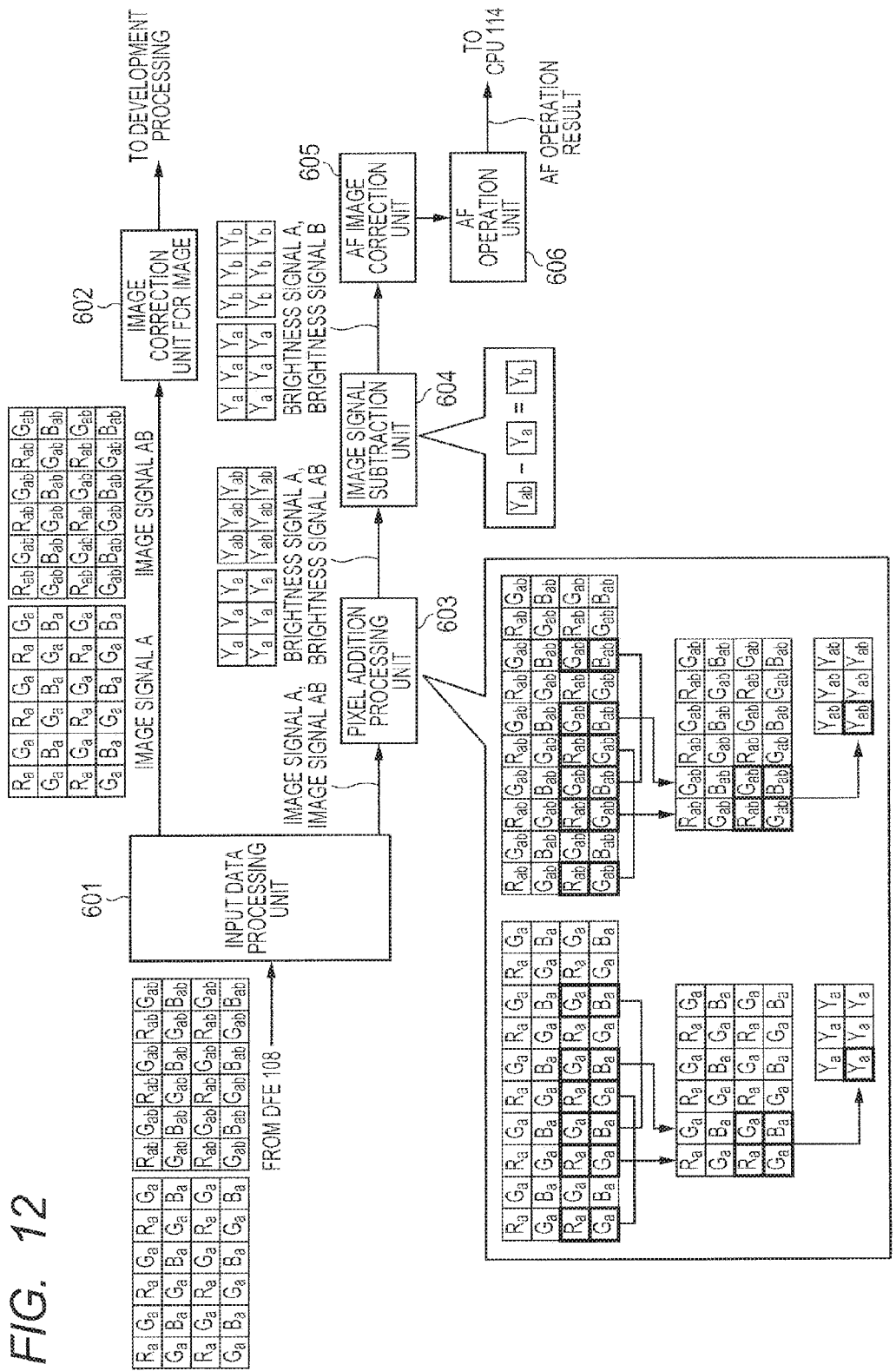
FIG. 12 is a schematic view illustrating a signal processing method according to the second embodiment of the present invention.

An imaging apparatus according to a second embodiment of the present invention will be described with reference to FIGS. 11 and 12. The same reference numerals are given to the constituent elements similar to those in the imaging apparatus according to the first embodiment illustrated in FIGS. 1 to 10 and description will be omitted or simplified. FIG. 11 is a timing chart illustrating the readout operation of the imaging element in the imaging apparatus according to the present embodiment. FIG. 12 is a schematic view illustrating signal processing method according to the present embodiment.

In the first embodiment, configuration in which the data of the image signal A in the imaging element 106 is additionally averaged and the data amount is compressed is described. This is possible because the image signal A is not used for image generation, but depending on the photographing mode, there can be a mode in which the image signal A is used for image generation. For example, a case of so-called "refocus" processing in which the image signal. A and the image signal AB are obtained for all the pixels and a focus position is adjusted later at the time of image generation applies to that. By subtracting the image signal A from the image signal AB of the same pixel, an image signal B corresponding to the signal of the sub pixel b is generated, and by shifting spatial positions of the image signal A and the image signal B and adding them, an image that the focus position is shifted can be generated.

In the present embodiment, a driving method of an imaging apparatus (camera) having such photographing modes will be described.

The photographing mode of the imaging apparatus of the present embodiment has a photographing mode 1 in which the image signal A is not used for image generation and a photographing mode 2 in which the image signal A is used for image generation, and it is assumed that which mode is to be used for photographing is set by a user through an operation unit, not illustrated. The CPU 114 drives the imaging element 106 through the TG 113 according to the setting. The operation in the photographing mode 1 is as described in the first embodiment.

If the photographing mode 2 is set, the imaging element 106 performs output without addition also for the image signal A according to the driving signal output from the TG 113. In the photographing mode 2, the readout operation of the imaging element 106 is performed according to the timing chart illustrated in FIG. 11, for example.

First, from the time t11 to the time t25, similarly to the operation from the time t11 to the time t25 of the readout operation in the first embodiment illustrated in FIG. 8, the signals read out from the sub pixels a and b are stored in the capacitors 509, 510, 511 and 512.

In the photographing mode 2, since addition averaging of the pixel signal is not performed, during the period corresponding to the time t26 to the time t31 of the readout operation of the first embodiment illustrated in FIG. 8, the signals ada and adb are maintained at the Low level.

Subsequently, during the period from the time t31 to the time t32, the select signal ha1 is changed from the Low level to the High Level by the horizontal scanning circuit 311, and the horizontal transfer switches 305 and 306 are turned on. As a result, the signal stored in the capacitor 509 (first S-signal holding capacitor) and the signal stored in the capacitor 510 (first N-signal holding capacitor) are output to the output terminal 315 via the horizontal output lines 309 and 310 and the differential amplifier 314.

Subsequently, during the period from the time t32 to the time t33, the signal chres is changed from the Low level to the High level, and the horizontal output line reset switches 312 and 313 are turned on. As a result, the horizontal output lines 309 and 310 are reset to the level of the reset voltage Vchres.

Subsequently, during the period from the time t33 to the time t38, the operation similar to that during the period from the time t31 to the time t33 is repeatedly performed, and signals from the capacitors 509 and 510 from the second column to the k-th column are sequentially read out. As a result, the signals (image signals A) of the sub pixel a for one row are output.

When the readout of the image signal A is finished, during the subsequent period from the time t41 to the time t42, the select signal hb1 is changed from the Low level to the High level by the horizontal scanning circuit 311, and the horizontal transfer switches 307 and 308 are turned on. As a result, the signal stored in the capacitor 511 (second S-signal holding capacitor) and the signal stored in the capacitor 512 (second N-signal holding capacitor) are output to the output terminal 315 via the horizontal output lines 309 and 310 and the differential amplifier 314.

Subsequently, during the period from the time t42 to the time t43, the signal chres is changed from the Low level to the High level, and the horizontal output line reset switches 312 and 313 are turned on. As a result, the horizontal output lines 309 and 310 are reset to the level of the reset voltage Vchres.

Subsequently, during the period from the time t43 to the time t48, the operation similar to that during the period from the time t41 to the time t43 is repeatedly performed, and the signals from the capacitors 511 and 512 from the second column to the k-th column are sequentially read out. As a result, the a/b addition signals (image signals AB) for one row are output.

Subsequently, a signal processing method of the image signal A and the image signal AB in the DSP 109 will be described with reference to FIG. 12.

Into the input data processing unit 601 of the DSP 109, the signals (the image signal A and the image signal AB) read out from the imaging element 106 by the aforementioned readout operation are input through the AFE 107 and the DFE 108. The input data processing unit 601 outputs the image signal A and the image signal AB as the data for image processing to the image correction unit 602 for image and outputs them also to the pixel addition processing unit 603 as the AF data. At this point of time, the image signal A and the image signal AB are not subjected to addition averaging processing.

In the pixel addition processing unit 603, similarly to the operation applied to the image signal AB in the first embodiment, the addition averaging processing is applied to the pixels in the same color in the horizontal direction and then, the pixel signals (the image signal A and the image signal AB) are added for each pixel array of two rows by two columns which is a pixel array unit of the Bayer array. As a result, an AF signal at a spatial sampling frequency equal to that of the photographing mode 1 can be obtained.

After that, in the image signal subtraction unit 604, the AF image correction unit 605 and the AF operation unit 606, AF processing is executed by performing the processing similar to that in the photographing mode 1 described in the first embodiment.

The addition averaging processing is performed for the pixels in the same color in the horizontal direction in the pixel addition processing unit 603 in order to match the spatial sampling frequencies so as to match the AF processing in the photographing mode 1 and the photographing mode 2 with each other. If the AF processing can be different between those modes, pixel addition does not have to be performed for the pixels in the same color.

As described above, the present embodiment is configured such that a block for performing the addition averaging processing of the image signal A is different between the photographing mode 1 and the photographing mode 2. In the photographing mode 1, the addition averaging processing of the image signal A is performed in the imaging element 106 (before branching to the image data and the AF data), while in the photographing mode 2, the addition averaging processing is performed for the image signal A and the image signal AB in the DSP 109 (after branching into the image data and the AF data). As a result, the frame rate to the data transfer rate can be increased in the photographing mode 1, while a spatial sampling frequency of the image signal A sufficient for use for image generation can be ensured in the photographing mode 2.

As described above, according to the present embodiment, the imaging apparatus capable of highly accurate focus detection can be realized based on the information from the imaging element while suppressing an increase of the data amount.

Third Embodiment

Figure 13:
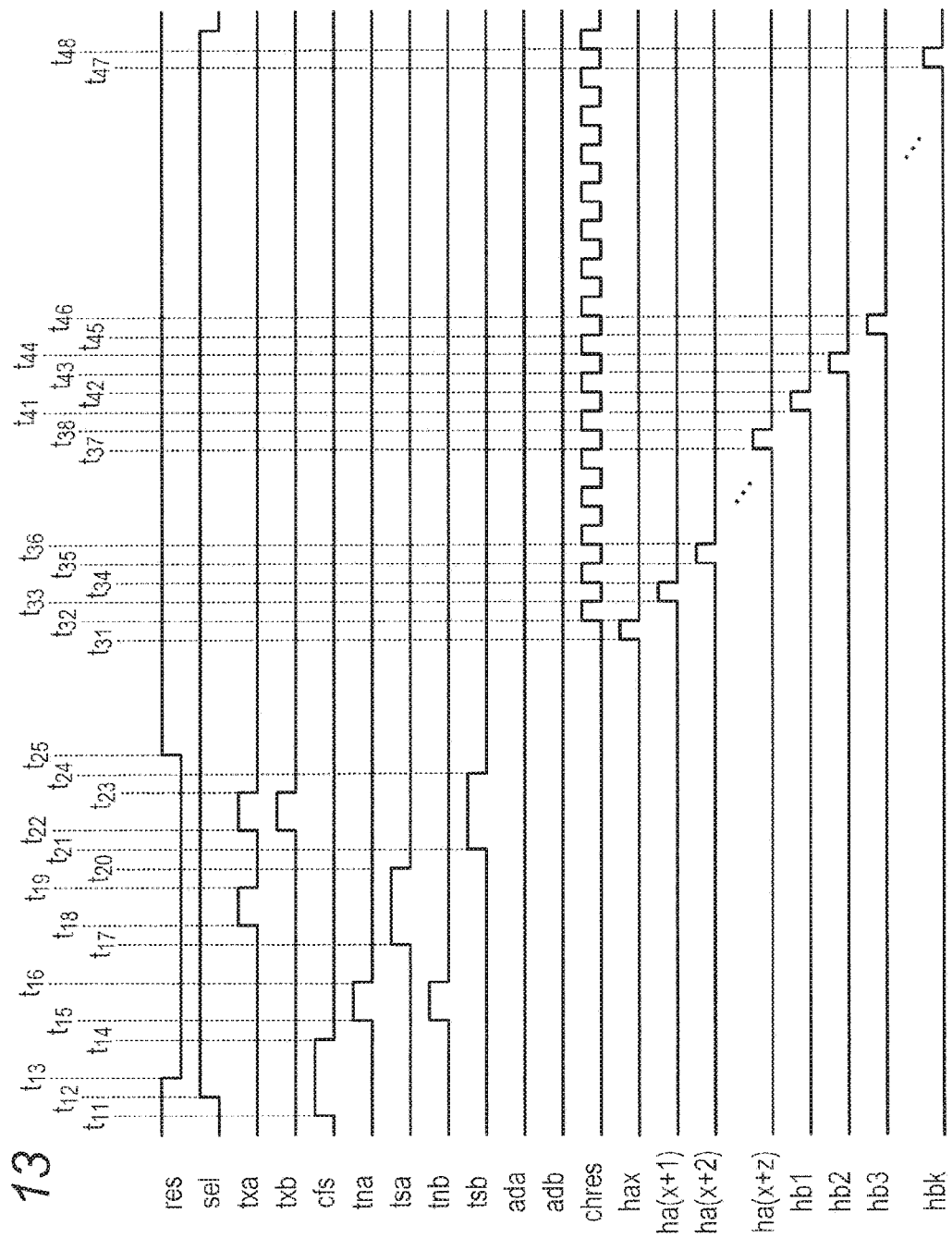
FIG. 13 is a timing chart illustrating a readout operation of an imaging element in an imaging apparatus according to a third embodiment of the present invention.
Figure 14:
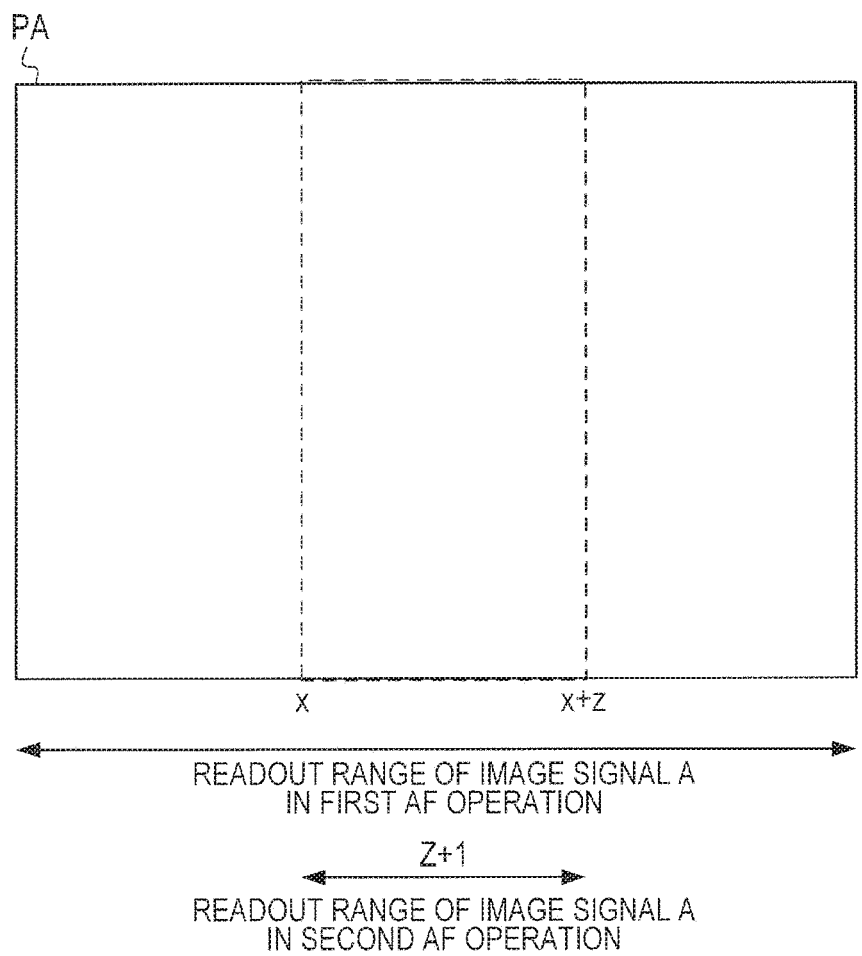
FIG. 14 is a schematic view illustrating a readout range of an image signal A in the signal processing method according to the third embodiment of the present invention.

An imaging apparatus according to a third embodiment of the present invention will be described with reference to FIGS. 13 and 14. The same reference numerals are given to the constituent elements similar to those in the imaging apparatus according to the first and second embodiments illustrated in FIGS. 1 to 12 and description will be omitted or simplified. FIG. 13 is a timing chart illustrating the readout operation of the imaging element in the imaging apparatus according to the present embodiment. FIG. 14 is a schematic view illustrating the readout range of the image signal A in the signal processing method according to the present embodiment.

In the second embodiment, the configuration in which whether the addition averaging processing is performed in the imaging element 106 or not is switched according to whether to use the image signal A or not for image generation is illustrated. However, a condition of switching whether to additionally average the image signal A or not is not limited to whether to use the image signal A for image generation or not.

In the present embodiment, configuration in which whether the addition averaging processing is performed in the imaging element 106 or not is switched according to a state of the AF processing (AF condition) will be described. Here, as an example, configuration in which the operation is switched between a state in the vicinity of a focused state and a state with a large defocus amount will be described.

First, in the case of largely out of focus, by the operation similar to that in the first embodiment, the image signal A is output from the imaging element 106 in an addition averaged state. At this time, a view angle of the output image signal A is assumed to be at least a full view angle in the horizontal direction of the pixel region PA. By configuring as above, a space range that can be referred to in the AF operation unit 606 is widened, and even if the defocus amount is large, focus detection can be made. Such operation is assumed to be a first AF operation.

Subsequently, the lens is driven based on a result of this focus detection, and if the defocus amount calculated in the AF operation unit 606 is not larger than a predetermined value, the operation proceeds to a second AF operation.

The readout operation of the imaging element 106 in the second AF operation is performed according to the timing chart illustrated in FIG. 13. The timing chart illustrated in FIG. 13 is the same as the timing chart in the second embodiment illustrated in FIG. 11 except that the operation of the horizontal scanning circuit 311 is different when the image signal A is output (time t31 to time t38).

That is, in the present embodiment, the image signal A is not output from all the columns but the image signal A is output from z+1 columns from the x-th column to the (x+z)-th column. Specifically, the horizontal scanning circuit 311 sequentially sets the select signals hax, ha(x+1), ha(x+2), . . . , x(x+z) to the High level and sequentially outputs the image signals A from the pixels of the x-th column, the (x+1)-th column, the (x+2)-th column, . . . , the (x+z)-th column from the output terminal 315. After the readout of the image signal A is finished, in the readout of the image signal AB (time t41 to time t48), similarly to the second embodiment, the image signal AB is output from the pixel of each column.

In the present embodiment, an example of a readout range of the image signal A from the imaging element 106 is illustrated in FIG. 14. In the first AF operation, the image signal A is read out from the pixels of all the columns in the view angle in the horizontal direction. At this time, the image signal A is additionally averaged in the horizontal direction, and the output data amount is ⅓ of that of the image signal AB.

On the other hand, in the second AF operation, the image signal A is read out from the pixel of a part of the columns surrounded by a dotted line. At this time, the addition averaging processing of the image signal A is not performed as in the first AF operation, but by limiting the view angle in the horizontal direction, the data amount is made equal to that of the first AF operation. As a result, the readout time and the data rate in the second AF operation become equal to those of the first AF operation. Before transition to the second AF operation, the defocus amount is narrowed to a certain amount or less in the first AF operation, and thus, the readout range can be limited in the second AF operation.

By means of this configuration, the AF operation can be made based on information on a fine sampling pitch in the second AF operation for final focusing, and thus, highly accurate AF processing can be executed.

The first AF operation and the second AF operation can be switched according to the size of the defocus amount set in advance. That is, it can be so configured that, if the defocus amount is at a predetermined value or more, the first AF operation (first mode) is executed, while if the defocus amount is less than the predetermined value, the second AF operation (second mode) is executed.

As described above, according to the present embodiment, the imaging apparatus capable of highly accurate focus detection can be realized based on the information from the imaging element while suppressing an increase of the data amount.

Fourth Embodiment

Figure 15:
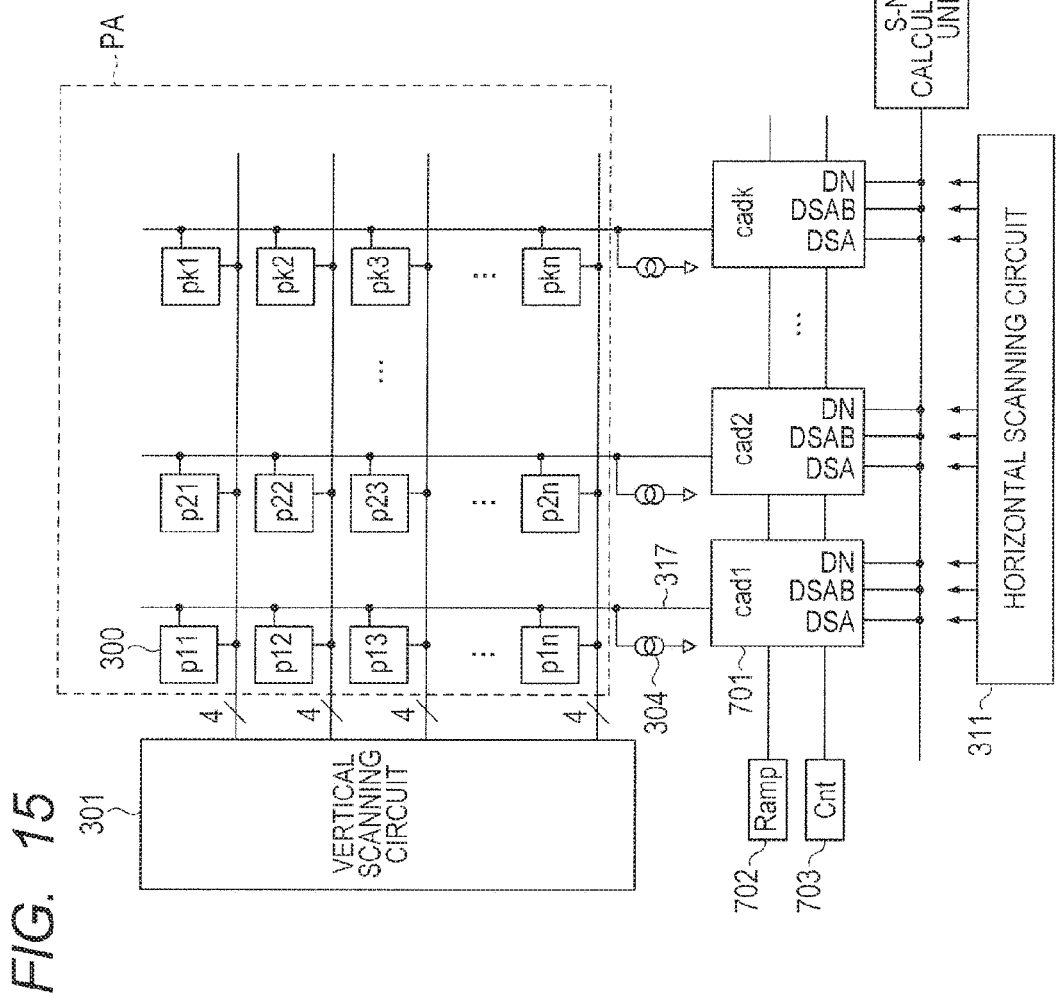
FIG. 15 is a schematic view illustrating an example of configuration of an imaging element in an imaging apparatus according to a fourth embodiment of the present invention.

An imaging apparatus according to the fourth embodiment of the present invention will be described with reference to FIG. 15. The same reference numerals are given to the constituent elements similar to those in the imaging apparatus according to the first to third embodiments illustrated in FIGS. 1 to 14 and description will be omitted or simplified. FIG. 15 is a schematic view illustrating an example of configuration of the imaging element in the imaging apparatus according to the present embodiment.

In the present embodiment, an example of a case in which the imaging element 106 has an AD converter in each column and has configuration of a so-called column ADC of outputting a signal in digital data will be described. Though not particularly illustrated here, in the imaging element 106 of the present embodiment, the AFE 107 is not necessary in the entire configuration of the imaging apparatus in FIG. 1.

The imaging element 106 of the imaging apparatus according to the present embodiment includes a column circuit 701, a lamp signal generation unit 702, a counter 703, an S-N calculation unit 704, a pixel addition unit 705, a selector 706, an LVDS output unit 707 and an output terminal 708.

The column circuit 701 is connected to the vertical output line 317 of each column of the pixel array of the pixel region PA, respectively. The column circuit 701 includes an AD converter arranged in each column. Here, as an AD conversion method, configuration of the case in which a so-called lamp method is used for outputting a digital signal based on comparison between a pixel signal output via the vertical output line 317 and a lamp signal output from the lamp signal generation unit 702 is illustrated. A count value used as an index of the digital value at that time is supplied to the column circuit 701 of each column from the counter 703. The AD conversion in the column circuit 701 is performed to each of the aforementioned noise signal t, the pixel signal Sa and the pixel signal Sab, and the results are held in the column circuit 701 of each column as signals DN, DSA and DSAB. The column circuit 701 constitutes a readout circuit unit for reading out an output signal from each pixel or its sub pixel of the pixel region PA similarly to the common column readout circuit 303.

The signals DN, DSA and DSAB held in the column circuit 701 of each column are sequentially transferred to the S-N calculation unit 704 by control by the horizontal scanning circuit 311.

First, during an output period of the image signal A, the signal DN and the signal DSA are sequentially transferred from the first column to the S-N calculation unit 704. In the S-N calculation unit 704, calculation processing of SA-N is executed to these signals, and the image signal A is generated. An output of the S-N calculation unit 704 is input into the pixel addition unit 705 and is subjected to the addition averaging processing in the horizontal direction similar to that described in the first embodiment. In the first embodiment, the addition averaging processing is executed to an analog signal, but here, the addition averaging processing is executed to the digital data. In the selector 706, either of output of data after the addition averaging processing and output of data not subjected to the addition averaging processing is selected. Here, it is assumed that a result of addition averaging is transmitted to the LVDS output unit 707 by selecting the output of the pixel addition unit 705. The LVDS output unit 707 performs parallel-serial conversion and conversion to LVDS and outputs a signal from the output terminal 708 of the imaging element.

Subsequently, during an output period of the image signal AB, the signal DN and the signal DSAB are sequentially transferred from the first column to the S-N calculation unit 704. In the S-N calculation unit 704, processing of SAB-N is executed to these signals, and the image signal AB is generated. An output of the S-N calculation unit 704 is input into the pixel addition unit 705 and the selector 706. The selector 706 here is assumed to transmit the image signal AB output from the S-N calculation unit 704 to the LVDS output unit 707 without addition averaging but as it is. The LVDS output unit 707 performs parallel-serial conversion and conversion to LVDS and outputs a signal from the output terminal 708 of the imaging element.

By repeating the aforementioned operation for each row, the operation in which the image signal A is additionally averaged and output, while the image signal AB is output without addition averaging is repeated each row, and the effect similar to that described in the first embodiment can be also obtained for the imaging element with the column ADC configuration.

As described above, according to the present embodiment, the imaging apparatus capable of highly accurate focus detection can be realized based on the information from the imaging element while suppressing an increase of the data amount.

Modified Embodiments

Embodiments of the present invention have been described above, out the present invention is not limited to these embodiments but is capable of various variations and changes within a range of its gist.

For example, in the aforementioned embodiments, the addition averaging processing of the image signal A in the imaging element 106 is described only in the horizontal direction, but the pixel addition processing in the vertical direction may be further combined. As a result, the data amount of the image signal A can be further reduced. At this time, addition averaging processing of different methods such as the addition averaging processing in an analog signal in the horizontal direction and the addition averaging processing in a digital signal in the vertical direction can be combined.

A mode for switching whether the addition averaging processing of the image signal A is to be performed or not is not limited to the mode in the second and third embodiments. For example, configuration of switching according to the AF mode can De considered such as switching between a multi-point mode of automatically performing AF operation at many distance measuring points and an arbitrary point mode of performing the AF operation at an arbitrary one point. In this case, the addition averaging processing of the image signal A may be performed for the former, while the addition averaging processing of the image signal A is not performed for the latter.

Moreover, the configuration of the imaging apparatus illustrated in the aforementioned embodiments illustrates an example and the imaging apparatus to which the present invention can be applied is not limited to the configuration illustrated in FIG. 1. The circuit configuration of each unit of the imaging apparatus is not limited to the configuration illustrated in FIGS. 5, 6, 7, 9, 10, 12, 15 and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (RON), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087703, filed on Apr. 22, 2015, which is hereby incorporated by reference herein in its entirety.

What is claimed is:

1. An imaging apparatus comprising:
an imaging unit including a plurality of pixels each including a first photoelectric conversion unit for generating a first photoelectric signal, second photoelectric conversion unit for generating a second photoelectric signal, and a microlens guiding a first light flux passed through a first exit pupil of an imaging optical system to the first photoelectric conversion unit and a second light flux passed through a second exit pupil of the imaging optical system to the second photoelectric conversion unit;
a first mixing unit configured to mix a plurality of first photoelectric signals output from each of a plurality of pixels to generate a first signal;
a second mixing unit configured to mix the first photoelectric signal and the second photoelectric signal to generate a second signal to be output from each of the plurality of pixels;
an image processing unit configured to generate an image based on the second signal; and
a focus detection processing unit configured to perform focus detection based on the first signal and the second signal.

2. The imaging apparatus according to claim 1, further comprising:
a third mixing unit configured to mix the second photoelectric signals from a plurality of pixels to generate a third signal, wherein
the focus detection processing unit performs focus detection based on the first signal and the third signal.

3. The imaging apparatus according to claim 1, further comprising:
a control unit configured to switch between a first mode for forming the first signal and a second mode for not forming the first signal.

4. The imaging apparatus according to claim 3, wherein the control unit switches between the first mode and the second mode according to a photographing mode.

5. The imaging apparatus according to claim 3, wherein the control unit switches between the first mode and the second mode according to an AF condition.

6. The imaging apparatus according to claim 5, wherein the control unit switches to the first mode in a case where a distance measuring point is automatically selected from a plurality of distance measuring points and focus adjustment is performed, and switches to the second mode in a case where the focus adjustment is performed for a predetermined distance measuring point.

7. The imaging apparatus according to claim 5, wherein the control unit switches to the first mode in a case where a defocus amount is not less than a predetermined value, and switches to the second mode in a case where the defocus amount is less than the predetermined value.

8. The imaging apparatus according to claim 2, further comprising:
a control unit configured to switch between a first mode for forming the first signal and a second mode for not forming the first signal.

9. The imaging apparatus according to claim 8, wherein the control unit switches between the first mode and the second mode according to a photographing mode.

10. The imaging apparatus according to claim 8, wherein the control unit switches between the first mode and the second mode according to an AF condition.

11. The imaging apparatus according to claim 10, wherein the control unit switches to the first mode in a case where a distance measuring point is automatically selected from a plurality of distance measuring points and focus adjustment is performed, and switches to the second mode in a case where the focus adjustment is performed for a predetermined distance measuring point.

12. The imaging apparatus according to claim 10, wherein the control unit switches to the first mode in a case where a defocus amount is not less than a predetermined value and switches to the second mode when the defocus amount is less than the predetermined value.

13. The imaging apparatus according to claim 1, wherein the first mixing unit performs a mixing operation in a horizontal direction and in a vertical direction.

14. A method for controlling an imaging apparatus having an imaging unit that includes a plurality of pixels, wherein each pixel includes a first photoelectric conversion unit for generating a first photoelectric signal, a second photoelectric conversion unit for generating a second photoelectric signal, and a microlens guiding a first light flux passed through a first exit pupil of an imaging optical system to the first photoelectric conversion unit and a second light flux passed through a second exit pupil of the imaging optical system to the second photoelectric conversion unit, the method comprising:
mixing a plurality of the first photoelectric signals output from a plurality of pixels to generate a first signal corresponding to the light flux passed through the first exit pupil of the imaging optical system;
mixing the first photoelectric signal and the second photoelectric signal to generate a second signal to be output from each of the plurality of pixels;
generating image data based on the second signal; and
generating focus detection data based on the first signal and the second signal.

15. A non-transitory computer readable storage medium storing a program executed in an imaging apparatus having an imaging unit that includes a plurality of pixels, wherein each pixel includes a first photoelectric conversion unit for generating a second photoelectric signal, a second photoelectric conversion unit for generating a second photoelectric signal, and a microlens guiding a first light flux passed through a first exit pupil of an imaging optical system to the first photoelectric conversion unit and a second light flux passed through a second exit pupil of the imaging optical output system to the second photoelectric conversion unit, causing a computer to execute:
mixing a plurality of the first photoelectric signals output from a plurality of pixels to generate a first signal corresponding to the first light flux passed through the first exit pupil of the imaging optical system;

mixing the first photoelectric signal and the second photoelectric signal to generate a second signal to be output from each of the plurality of pixels;

generating image data based on the second signal; and generating focus detection data based on the first signal and the second signal.

16. The imaging apparatus according to claim 1,
wherein the first photoelectric conversion unit and the second photoelectric conversion unit are arranged in a horizontal direction in each of the plurality of pixels, and
wherein the first mixing unit mixes a plurality of the first photoelectric signals output from each of a plurality of pixels arranged in the horizontal direction.

17. The imaging apparatus according to claim 1,
wherein the first signal is exclusively used for focus detection.

* * * * *